United States Patent
Hayakawa et al.

(10) Patent No.: US 9,581,794 B2
(45) Date of Patent: Feb. 28, 2017

(54) ZOOM LENS SYSTEM

(71) Applicant: HOYA CORPORATION, Tokyo (JP)

(72) Inventors: Koichiro Hayakawa, Saitama (JP); Daisuke Koreeda, Saitama (JP)

(73) Assignee: HOYA CORPORATION, Tokyo (JP)

( * ) Notice: Subject to any disclaimer, the term of this patent is extended or adjusted under 35 U.S.C. 154(b) by 0 days.

(21) Appl. No.: 15/010,432

(22) Filed: Jan. 29, 2016

(65) Prior Publication Data

US 2016/0231544 A1  Aug. 11, 2016

(30) Foreign Application Priority Data

Feb. 5, 2015  (JP) ................................. 2015-020825

(51) Int. Cl.
  *G02B 15/14* (2006.01)
  *G02B 15/173* (2006.01)

(52) U.S. Cl.
  CPC ................... *G02B 15/173* (2013.01)

(58) Field of Classification Search
  CPC ....... G02B 15/173; G02B 13/004; G02B 9/34
  See application file for complete search history.

(56) References Cited

U.S. PATENT DOCUMENTS

| | | |
|---|---|---|
| 2012/0127586 A1 | 5/2012 | Sudoh |
| 2012/0307367 A1* | 12/2012 | Bito ................. G02B 13/18 359/557 |
| 2013/0050843 A1 | 2/2013 | Nakamura |

FOREIGN PATENT DOCUMENTS

| | | |
|---|---|---|
| JP | 2012-112996 | 6/2012 |
| JP | 2013-44814 | 3/2013 |
| JP | 2014-85414 | 5/2014 |
| WO | 2011/102090 | 8/2011 |

* cited by examiner

*Primary Examiner* — Joseph P Martinez
(74) *Attorney, Agent, or Firm* — Greenblum & Bernstein, P.L.C.

(57) ABSTRACT

A zoom lens system includes a positive first lens group, a negative second lens group, a positive third lens group and a positive fourth lens group, in that order from the object side. Upon zooming from the short to long focal length extremities, each of the first through fourth lens groups move along the optical axis thereof. The following conditions (1) and (2) are satisfied:

$1.05 < ft/f1 < 1.75$ (1), and $3.7 < M3t/M3w < 6.3$ (2), wherein f1 designates the focal length of the first lens group, ft designates the focal length of the entire zoom lens system at the long focal length extremity, and M3t and M3w designate the lateral magnifications of the third lens group when focusing on an object at infinity at the long and short focal length extremities, respectively.

11 Claims, 21 Drawing Sheets

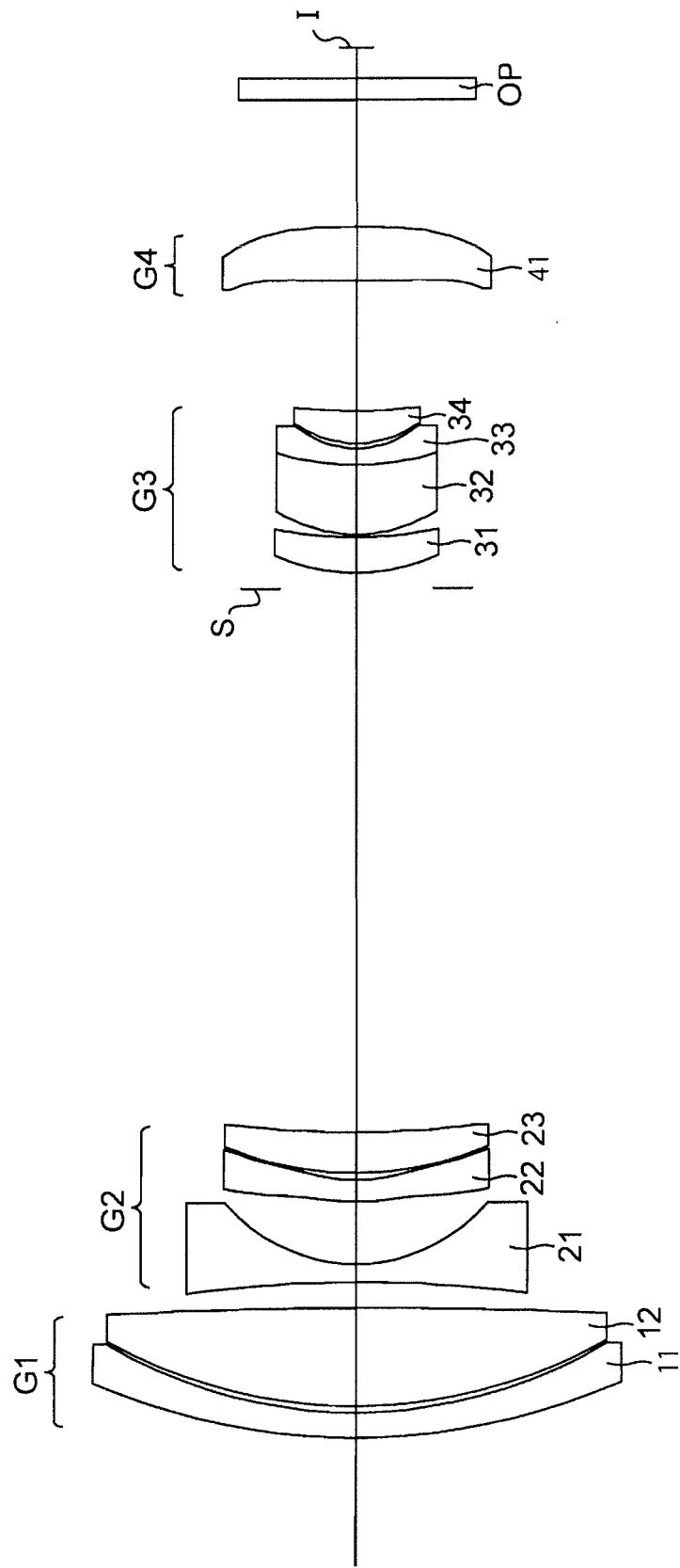

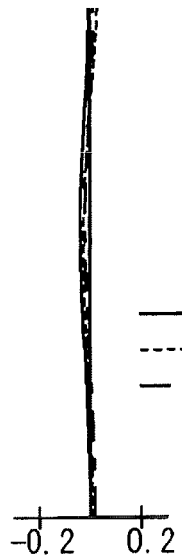
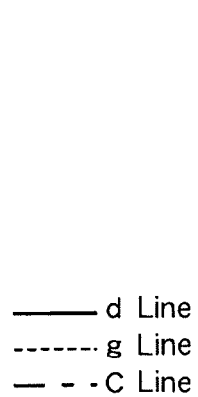
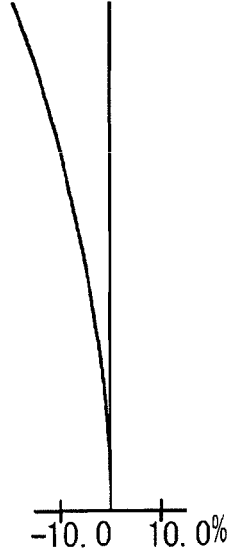
Fig. 2A
FNO.=1:2.90
−0.2  0.2
SPHERICAL
ABERRATION
CHROMATIC
ABERRATION
Fig. 2B
Y=3.76
— d Line
----- g Line
— - - C Line
−0.01  0.01
LATERAL
CHROMATIC
ABERRATION
Fig. 2C
Y=3.76
— S
--- M
−0.3  0.3
ASTIGMATISM
Fig. 2D
Y=3.76
−10.0  10.0%
DISTORTION
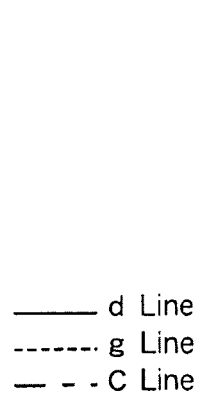
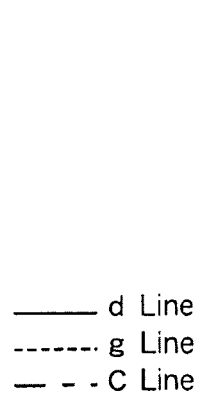
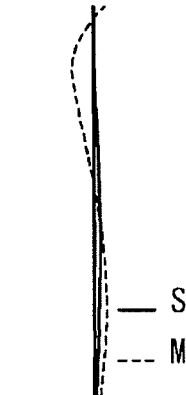
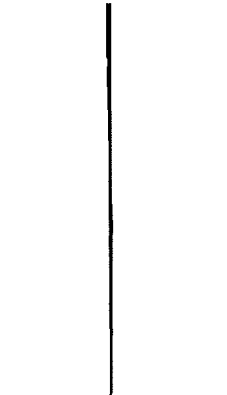
Fig. 3A
FNO.=1:4.26
−0.2  0.2
SPHERICAL
ABERRATION
CHROMATIC
ABERRATION
Fig. 3B
Y=4.60
— d Line
----- g Line
— - - C Line
−0.01  0.01
LATERAL
CHROMATIC
ABERRATION
Fig. 3C
Y=4.60
— S
--- M
−0.3  0.3
ASTIGMATISM
Fig. 3D
Y=4.60
−10.0  10.0%
DISTORTION

FNO.=1:6.15

-0.2  0.2
SPHERICAL
ABERRATION
CHROMATIC
ABERRATION

— d Line
----- g Line
— - C Line

Y=4.60

-0.01  0.01
LATERAL
CHROMATIC
ABERRATION

Y=4.60

— S
--- M

-0.3  0.3
ASTIGMATISM

Y=4.60

-10.0  10.0%
DISTORTION

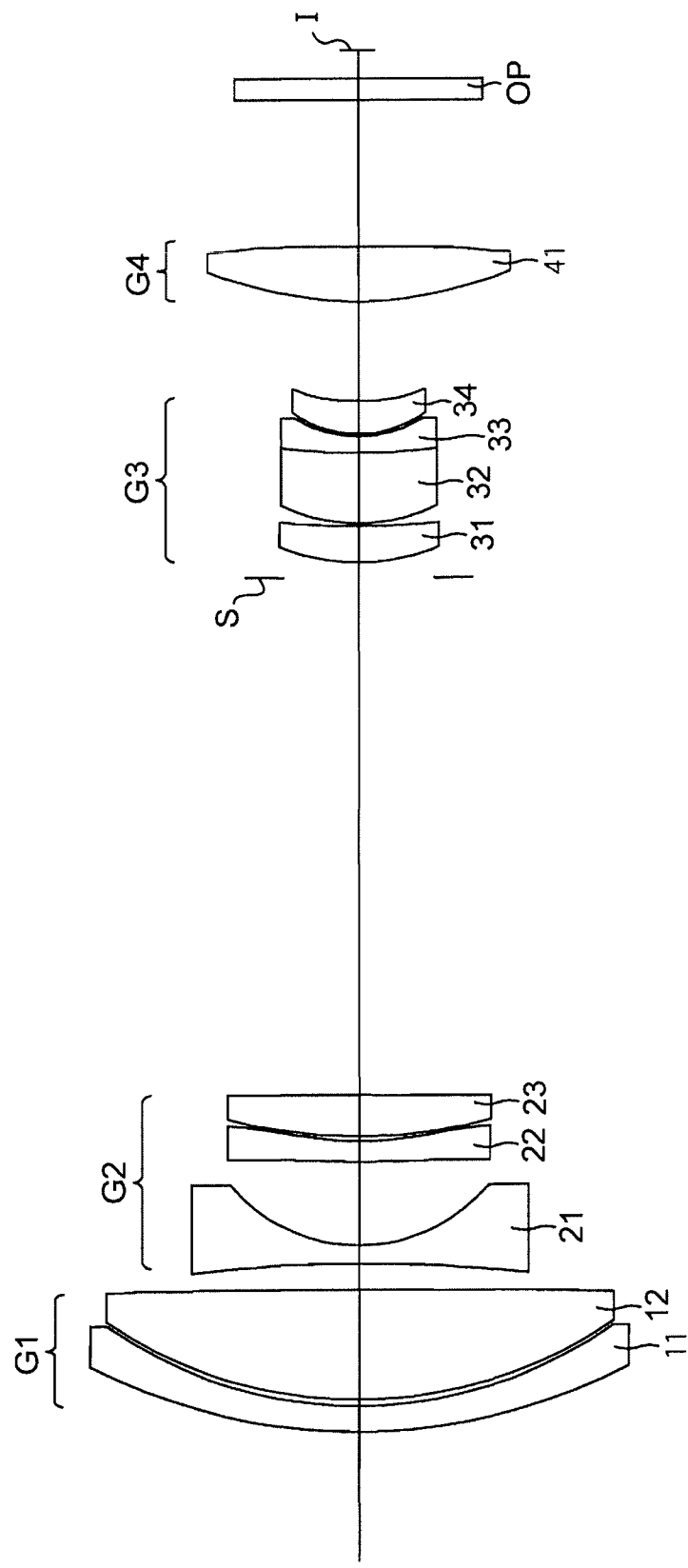

FNO.=1:2.90

—— d Line
------ g Line
— - - C Line

-0.2  0.2
SPHERICAL
ABERRATION
CHROMATIC
ABERRATION

Y=3.79

-0.01  0.01
LATERAL
CHROMATIC
ABERRATION

Y=3.79

—— S
--- M

-0.3  0.3
ASTIGMATISM

Y=3.79

-10.0  10.0%
DISTORTION

FNO.=1:4.09

—— d Line
------ g Line
— - - C Line

-0.2  0.2
SPHERICAL
ABERRATION
CHROMATIC
ABERRATION

Y=4.60

-0.01  0.01
LATERAL
CHROMATIC
ABERRATION

Y=4.60

—— S
--- M

-0.3  0.3
ASTIGMATISM

Y=4.60

-10.0  10.0%
DISTORTION

FNO.=1:6.34

SPHERICAL ABERRATION
CHROMATIC ABERRATION

— d Line
----- g Line
— - C Line

Y=4.60

LATERAL CHROMATIC ABERRATION

Y=4.60

ASTIGMATISM

— S
--- M

Y=4.60

DISTORTION

Fig.10A
FNO.=1:2.90

—— d Line
------ g Line
— - - C Line

—— S
--- M

-0.2  0.2
SPHERICAL
ABERRATION
CHROMATIC
ABERRATION

-0.01  0.01
LATERAL
CHROMATIC
ABERRATION

-0.3  0.3
ASTIGMATISM

-10.0  10.0%
DISTORTION

Fig.11A
FNO.=1:4.42

—— d Line
------ g Line
— - - C Line

—— S
--- M

-0.2  0.2
SPHERICAL
ABERRATION
CHROMATIC
ABERRATION

-0.01  0.01
LATERAL
CHROMATIC
ABERRATION

-0.3  0.3
ASTIGMATISM

-10.0  10.0%
DISTORTION

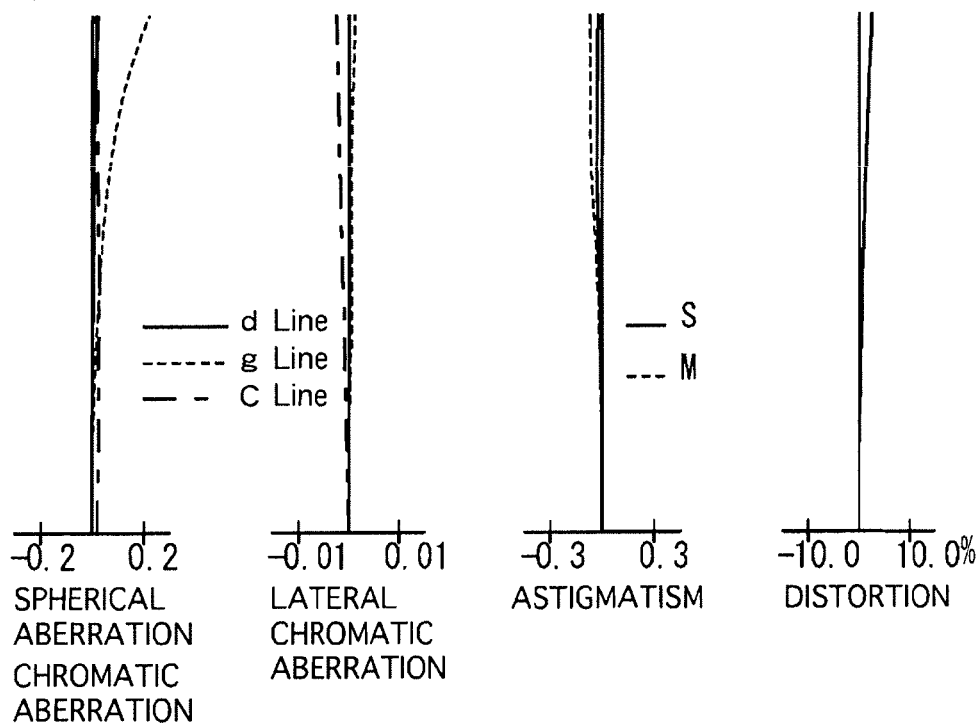

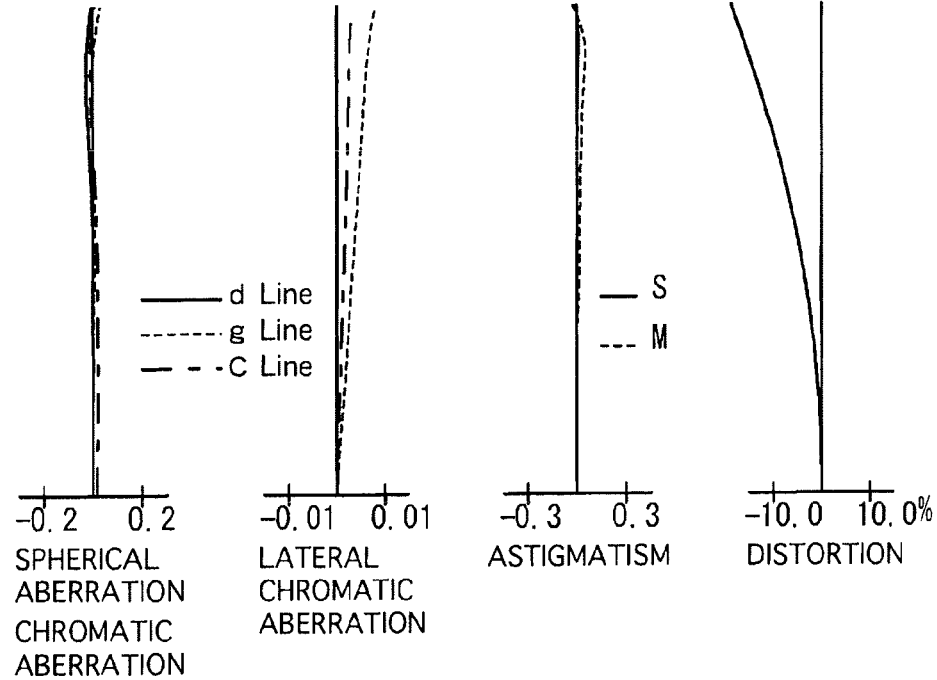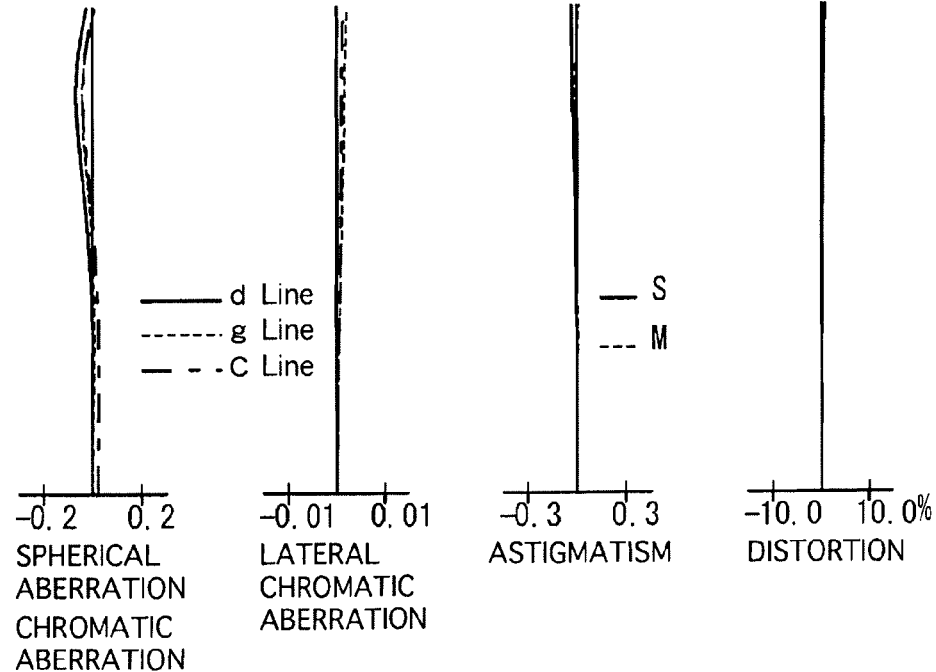

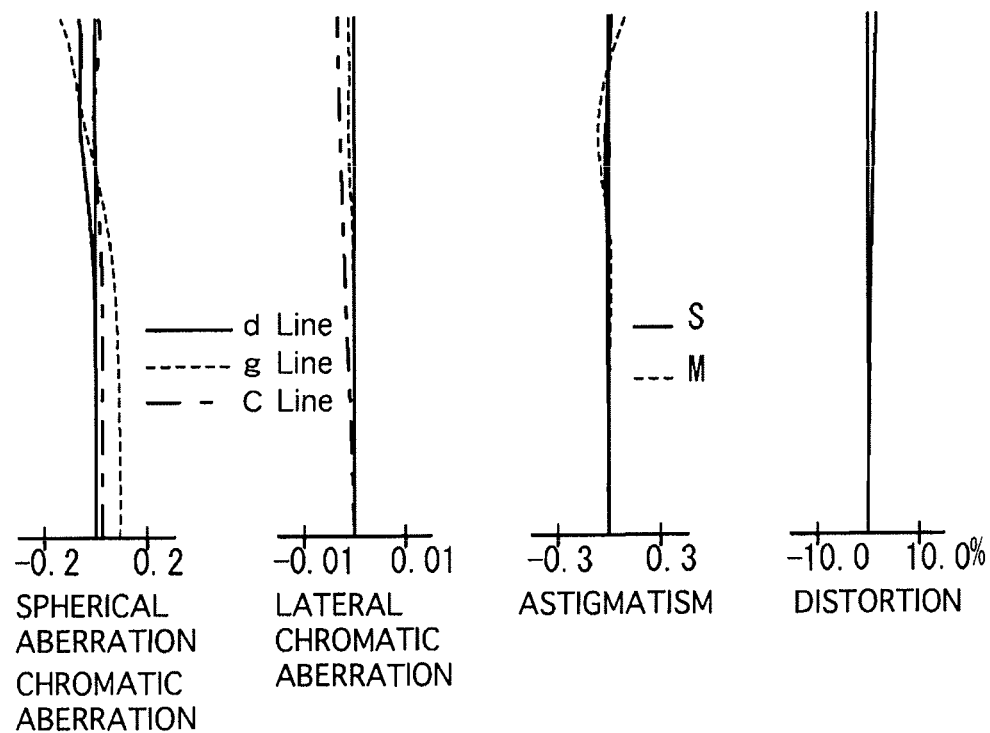

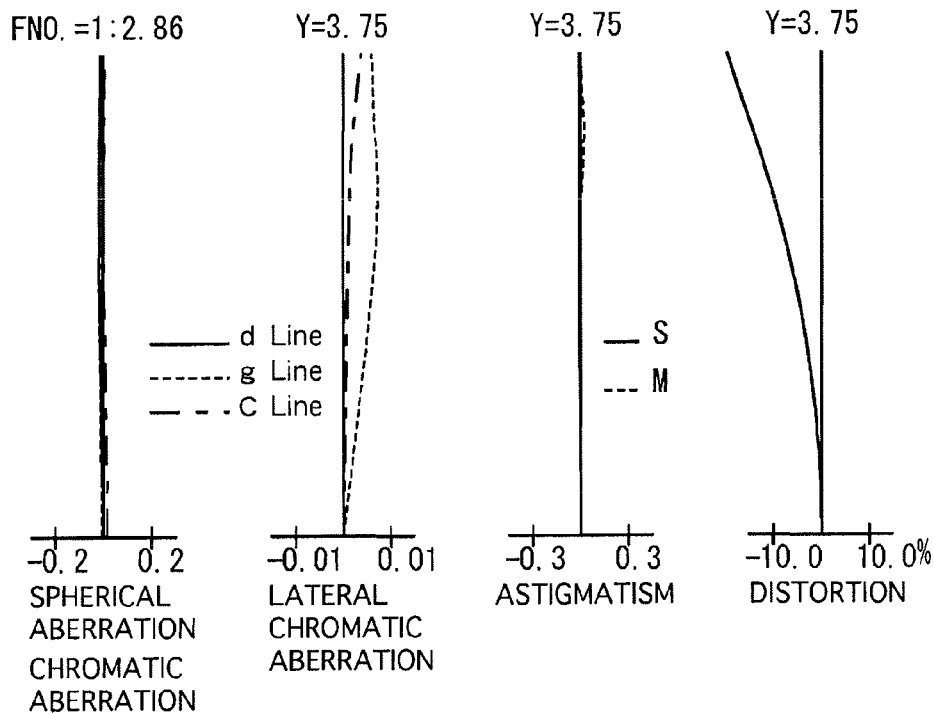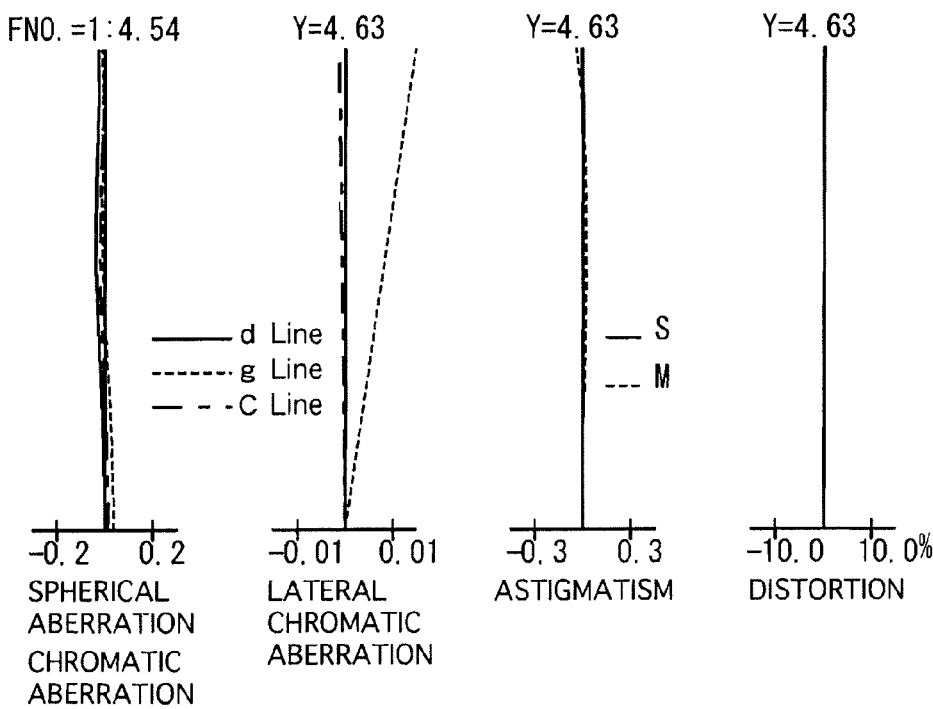

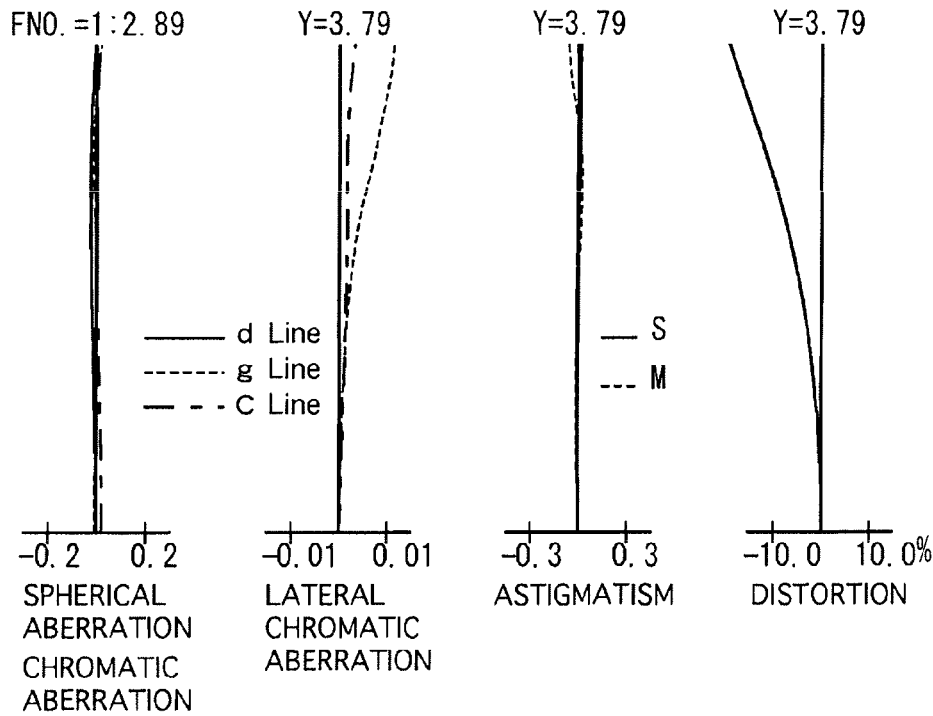
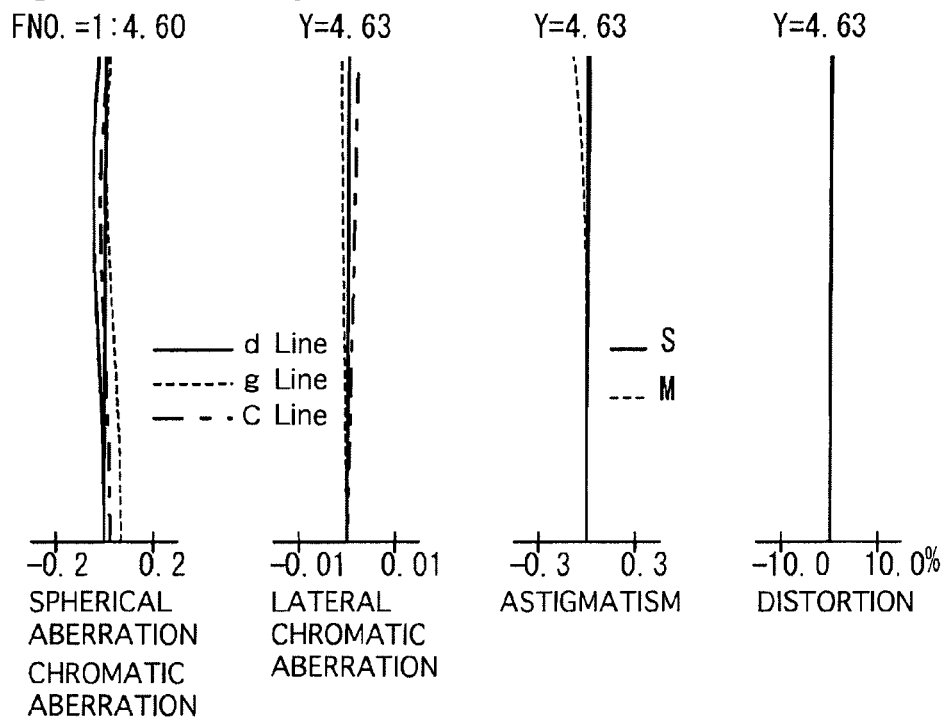

ZOOM LENS SYSTEM

BACKGROUND OF THE INVENTION

1. Field of the Invention

The present invention relates to a zoom lens system.

2. Description of Related Art

Patent Literature Nos. 1 through 4 each disclose a zoom lens system configured of four lens groups, i.e., a zoom lens system configured of a positive first lens group, a negative second lens group, a positive third lens group and a positive fourth lens group, in that order from the object side, which aims to achieve a relatively small f-number at the short focal length extremity (wide-angle extremity) and to achieve a high zoom ratio of approximately 10:1.

However, since zooming burden on the third lens group is small in each zoom lens system of Patent Literature Nos. 1 through 4, either a desired zoom ratio cannot be attained, or the correction of various aberrations such as chromatic aberration and astigmatism is insufficient.

Although the zoom ratios in the zoom lens systems of Patent Literature Nos. 1 and 4 are relatively high, the f-number is only 3.5, which is insufficient.

Although the f-number in the zoom lens system of Patent Literature No. 3 is less than or equal to 3.0, which is relatively small, the zoom ratio is only approximately 7:1, which does not satisfy the requirement for a high zoom ratio.

Patent Literature 1: Japanese Unexamined Patent Application No. 2012-112996

Patent Literature 2: Pamphlet of International Publication No. 2011/102090

Patent Literature 3: Japanese Unexamined Patent Application No. 2014-85414

Patent Literature 4: Japanese Unexamined Patent Application No. 2013-44814

SUMMARY OF THE INVENTION

The present invention has been devised in view of the above-mentioned problems, and provides a zoom lens system which has a small f-number of 3.0 or less, a high zoom ratio of approximately 12:1, and can favorably correct various aberrations such as chromatic aberration and astigmatism.

According to an aspect of the present invention, a zoom lens system is provided, including a positive first lens group, a negative second lens group, a positive third lens group and a positive fourth lens group, in that order from the object side. Upon zooming from the short focal length extremity to the long focal length extremity, each of the first through fourth lens groups move along the optical axis thereof. The following conditions (1) and (2) are satisfied:

$$1.05 < ft/f1 < 1.75 \qquad (1), \text{and}$$

$$3.7 < M3t/M3w < 6.3 \qquad (2),$$

wherein f1 designates the focal length of the first lens group, ft designates the focal length of the entire zoom lens system at the long focal length extremity, M3$t$ designates the lateral magnification of the third lens group when focusing on an object at infinity at the long focal length extremity, and M3$w$ designates the lateral magnification of the third lens group when focusing on an object at infinity at the short focal length extremity.

It is desirable for the following condition (3) to be satisfied:

$$0.27 < \Delta 3Gx/(ymax*(ft/fw)) < 0.60 \qquad (3),$$

wherein Δ3Gx designates the movement amount of the third lens group along the optical axis upon zooming from the short focal length extremity to the long focal length extremity, ymax designates the maximum image height, ft designates the focal length of the entire zoom lens system at the long focal length extremity, and fw designates the focal length of the entire zoom lens system at the short focal length extremity.

It should be noted that the value of Δ3Gx (which designates the movement amount of the third lens group along the optical axis upon zooming from the short focal length extremity to the long focal length extremity) refers to an absolute value, and does not have a "positive or negative" concept. Namely, regardless of whether the third lens group G3 is moved toward the object side or toward the image side, the value of Δ3Gx will always be positive.

It is desirable for the third lens group to include a positive lens element; a cemented lens having a positive lens element and a negative lens element; and a positive lens element having at least one aspherical surface formed thereon, in that order from the object side, and for the following condition (4) to be satisfied:

$$20 < v32 - v33 < 45 \qquad (4),$$

wherein v32 designates the Abbe number, with respect to the d-line, of the positive lens element of the cemented lens provided within the third lens group, and v33 designates the Abbe number, with respect to the d-line, of the negative lens element of the cemented lens provided within the third lens group.

It is desirable for the following condition (5) to be satisfied:

$$-8.8 < ft/f2 < -5.8 \qquad (5),$$

wherein f2 designates the focal length of the second lens group, and ft designates the focal length of the entire zoom lens system at the long focal length extremity.

It is desirable for the following condition (6) to be satisfied:

$$2.6 < M2t/M2w < 4.2 \qquad (6),$$

wherein M2$t$ designates the lateral magnification of the second lens group when focusing on an object at infinity at the long focal length extremity, and M2$w$ designates the lateral magnification of the second lens group when focusing on an object at infinity at the short focal length extremity.

It is desirable for the second lens group to include a negative lens element, a negative lens element, and a positive lens element, in that order from the object side, wherein the following conditions (7) and (8) are satisfied:

$$n21 > 1.8 \qquad (7), \text{and}$$

$$20 < v22 - v23 < 45 \qquad (8),$$

wherein n21 designates the refractive index, at the d-line, of the negative lens element on the object side provided within the second lens group, v22 designates the Abbe number, with respect to the d-line, of the negative lens element on the image side provided within the second lens group, and v23 designates the Abbe number, with respect to the d-line, of the positive lens element provided within the second lens group.

The third lens group can include a positive lens element closest to the image side, and each of the negative lens element provided on the image side within the second lens group and the positive lens element provided closest to the image side within the third lens group can be a plastic lens element.

Alternatively, the third lens group can include a positive lens element closest to the image side, and each of the positive lens element provided within the second lens group and the positive lens element provided closest to the image side within the third lens group can be a glass-molded lens element.

It is desirable for the following condition (9) to be satisfied:

$$0.06 < D1/f1 < 0.13 \quad (9),$$

wherein D1 designates the thickness of the first lens group, and f1 designates the focal length of the first lens group.

It is desirable for the first lens group to include a negative lens element and a positive lens element, in that order from the object side, wherein the following condition (10) is satisfied:

$$25 < v12-v11 < 45 \quad (10),$$

wherein v11 designates the Abbe number, with respect to the d-line, of the negative lens element provided within the first lens group, and v12 designates the Abbe number, with respect to the d-line, of the positive lens element provided within the first lens group.

It is desirable for the fourth lens group to include a positive single lens element, and for the positive single lens element to constitute a focusing lens group which moves in the optical axis direction during focusing.

According to the present invention, a zoom lens system is achieved which has a fast f-number of 3.0 or less, a high zoom ratio of approximately 12:1, and can favorably correct various aberrations such as chromatic aberration and astigmatism.

The present disclosure relates to subject matter contained in Japanese Patent Application No. 2015-020825 (filed on Feb. 5, 2015) which is expressly incorporated herein in its entirety.

BRIEF DESCRIPTION OF THE DRAWINGS

The present invention will be discussed below in detail with reference to the accompanying drawings, in which:

FIG. 1 shows a lens arrangement of a first numerical embodiment of a zoom lens system, when focused on an object at infinity at the short focal length extremity;

FIGS. 2A, 2B, 2C and 2D show various aberrations that occurred in the zoom lens system, having the lens arrangement of FIG. 1, when focused on an object at infinity at the short focal length extremity;

FIGS. 3A, 3B, 3C and 3D show various aberrations that occurred in the zoom lens system, having the lens arrangement of FIG. 1, when focused on an object at infinity at an intermediate focal length;

FIG. 5 shows a lens arrangement of a second numerical embodiment of a zoom lens system, when focused on an object at infinity at the short focal length extremity;

FIGS. 10A, 10B, 100 and 10D show various aberrations that occurred in the zoom lens system, having the lens arrangement of FIG. 9, when focused on an object at infinity at the short focal length extremity;

FIGS. 11A, 11B, 11C and 11D show various aberrations that occurred in the zoom lens system, having the lens arrangement of FIG. 9, when focused on an object at infinity at an intermediate focal length;

FIGS. 12A, 12B, 12C and 12D show various aberrations that occurred in the zoom lens system having the lens arrangement of FIG. 9, when focused on an object at infinity at the long focal length extremity;

FIGS. 14A, 14B, 14C and 14D show various aberrations that occurred in the zoom lens system, having the lens arrangement of FIG. 13, when focused on an object at infinity at the short focal length extremity;

FIGS. 15A, 15B, 15C and 15D show various aberrations that occurred in the zoom lens system, having the lens arrangement of FIG. 13, when focused on an object at infinity at an intermediate focal length;

FIGS. 16A, 16B, 16C and 16D show various aberrations that occurred in the zoom lens system having the lens arrangement of FIG. 13, when focused on an object at infinity at the long focal length extremity;

FIGS. 18A, 18B, 18C and 18D show various aberrations that occurred in the zoom lens system, having the lens arrangement of FIG. 17, when focused on an object at infinity at the short focal length extremity;

FIGS. 19A, 19B, 19C and 19D show various aberrations that occurred in the zoom lens system, having the lens arrangement of FIG. 17, when focused on an object at infinity at an intermediate focal length;

FIGS. 22A, 22B, 22C and 22D show various aberrations that occurred in the zoom lens system, having the lens arrangement of FIG. 21, when focused on an object at infinity at the short focal length extremity;

FIGS. 23A, 23B, 23C and 23D show various aberrations that occurred in the zoom lens system, having the lens arrangement of FIG. 21, when focused on an object at infinity at an intermediate focal length;

DESCRIPTION OF THE EMBODIMENTS

Figure 4A:
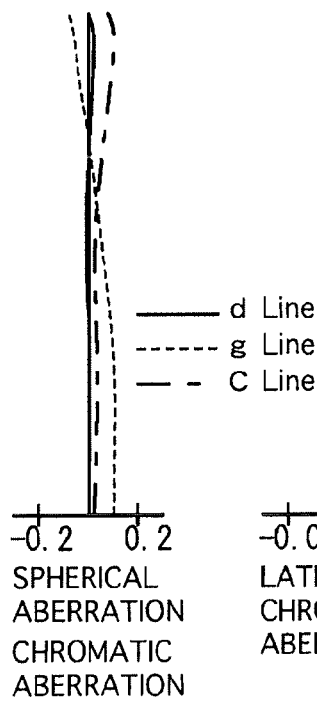
FIGS. 4A, 4B, 4C and 4D show various aberrations that occurred in the zoom lens system having the lens arrangement of FIG. 1, when focused on an object at infinity at the long focal length extremity.
Figure 4B:
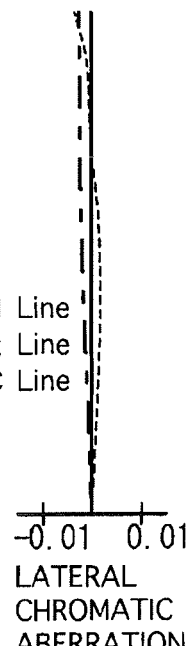
Figure 4C:
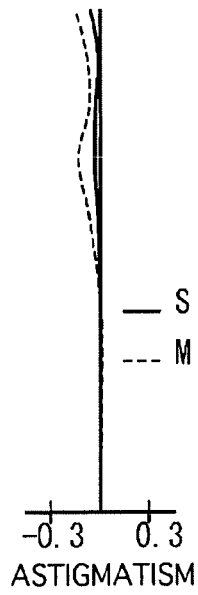
Figure 4D:
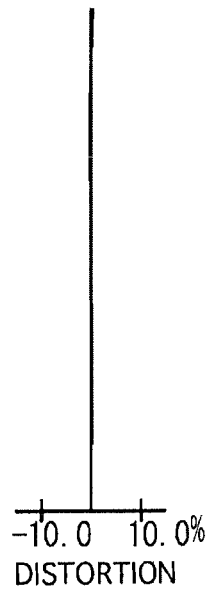
Figure 6A:
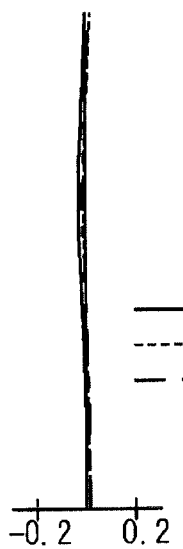
FIGS. 6A, 6B, 6C and 6D show various aberrations that occurred in the zoom lens system, having the lens arrangement of FIG. 5, when focused on an object at infinity at the short focal length extremity.
Figure 6B:
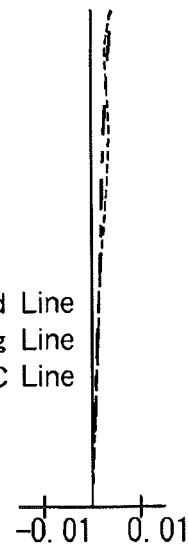
Figure 6C:
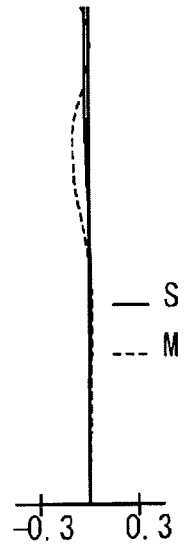
Figure 6D:
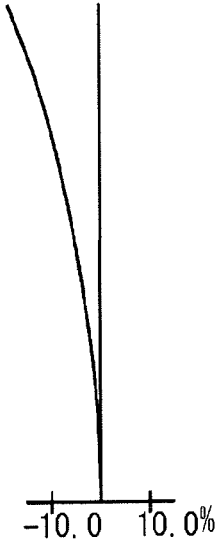
Figure 7A:
FIGS. 7A, 7B, 7C and 7D show various aberrations that occurred in the zoom lens system, having the lens arrangement of FIG. 5, when focused on an object at infinity at an intermediate focal length.
Figure 7B:
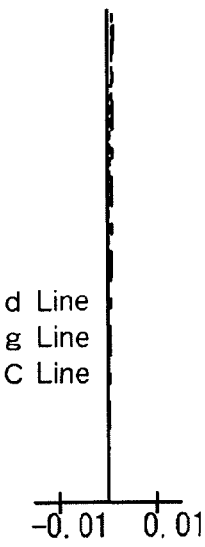
Figure 7C:
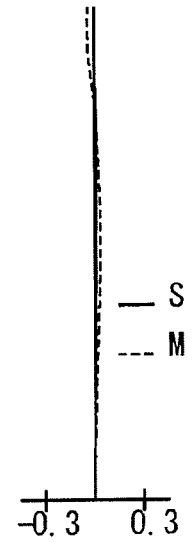
Figure 7D:
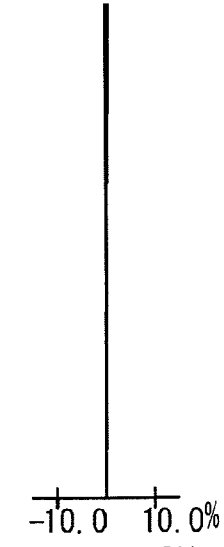
Figure 8A:
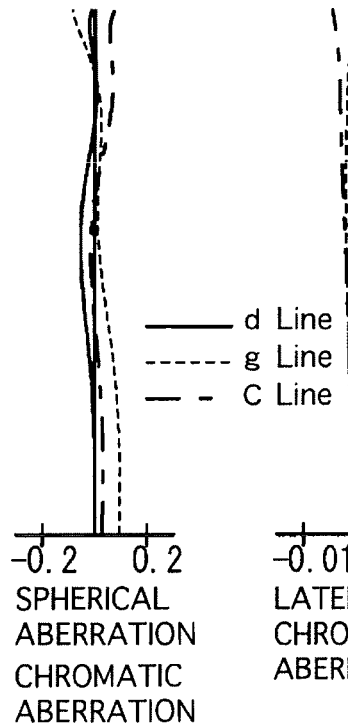
FIGS. 8A, 8B, 8C and 8D show various aberrations that occurred in the zoom lens system having the lens arrangement of FIG. 5, when focused on an object at infinity at the long focal length extremity.
Figure 8B:
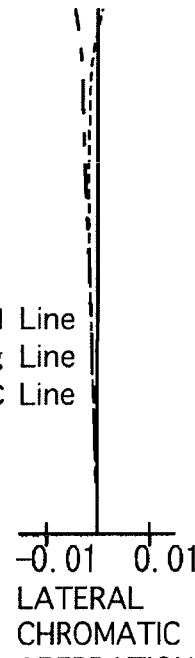
Figure 8C:
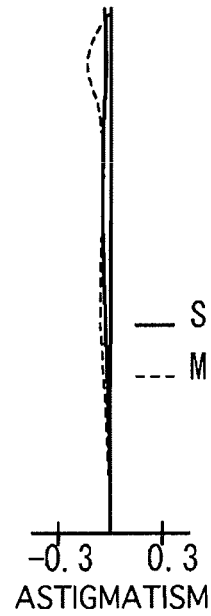
Figure 8D:

As shown in the first through sixth zoom paths of FIGS. 25 through 30, the zoom lens system of the illustrated embodiments is configured of a positive first lens group G1, a negative second lens group G2, a positive third lens group G3 and a positive fourth lens group G4, in that order from the object side. A diaphragm S is provided between the second lens group G2 and the third lens group G3 (immediately in front of the third lens group G3). The diaphragm S integrally moves with the third lens group G3. "I" designates the imaging surface.

In the zoom lens system of the illustrated embodiments, upon zooming from the short focal length extremity (W) to the long focal length extremity (T) via an intermediate focal length (M), the first through fourth lens groups G1 through G4 move along the optical axis so that the distance between the first lens group G1 and the second lens group G2 increases, the distance between the second lens group G2 and the third lens group G3 decreases, and the distance between the third lens group G3 and the fourth lens group G4 increases.

More specifically, upon zooming from the short focal length extremity (W) to the long focal length extremity (T) via an intermediate focal length (M), the first through fourth lens groups G1 through G4 move along the optical axis direction in the following manner.

In the first numerical embodiment (FIG. 25), the first lens group G1 moves monotonically toward the object side. In the second through sixth numerical embodiments (FIGS. 26 through 30), the first lens group G1 first moves toward the image side and thereafter moves toward the object side to a position exceeding the short focal length extremity (resulting in the first lens group G1 moving toward the object side overall).

In the first through fifth numerical embodiments (FIGS. 25 through 29), the second lens group G2 first moves toward the image side and thereafter moves toward the object side to a position exceeding the short focal length extremity (resulting in the second lens group G2 moving toward the object side overall). In the sixth numerical embodiment (FIG. 30), the second lens group G2 first moves toward the image side and thereafter moves slightly toward the object side (resulting in the second lens group G2 moving toward the image side overall).

In the first through sixth numerical embodiments (FIGS. 25 through 30), the third lens group G3 moves monotonically toward the object side.

In the first through sixth numerical embodiments (FIGS. 25 through 30), the fourth lens group G4 first moves toward the object side and thereafter moves toward the image side (the fourth lens group G4 'U-turns').

Furthermore, there is a certain degree of freedom in behavior (i.e., the distances between the lens groups and the zoom path) of the first through fourth lens groups G1 through G4 during zooming from the short focal length extremity (W) to the long focal length extremity (T) via the intermediate focal length (M); various design changes are possible.

In the first through sixth numerical embodiments, the first lens group G1 is configured of a negative lens element 11 and a positive lens element 12, in that order from the object side.

In the first through sixth numerical embodiments, the second lens group G2 is configured of a negative lens element 21, a negative lens element 22 and a positive lens element 23, in that order from the object side.

In the first through fourth and sixth numerical embodiments, the negative lens element 22 is a plastic lens element having an aspherical surface formed on each side thereof. In the fifth numerical embodiment, the negative lens element 22 is a glass lens element and has a spherical surface formed on each side thereof.

In the fifth numerical embodiment, the positive lens element 23 is a glass-molded lens element having an aspherical surface formed on each side thereof. In the first through fourth and sixth numerical embodiments, the positive lens element 23 is a glass lens element (polished glass lens element) having a spherical surface on each side thereof.

In the first through sixth numerical embodiments, the third lens group G3 is configured of a positive lens element 31; a cemented lens having a positive lens element 32 and a negative lens element 33; and a positive lens element 34, in that order from the object side.

In the fourth numerical embodiment, the positive lens element 31 is a glass-molded lens element having an aspherical surface formed on the object side thereof. In the first through third, fifth and sixth numerical embodiments, the positive lens element 31 is a glass lens element (polished glass lens element) having a spherical surface on each side thereof.

In the first through fourth and sixth numerical embodiments, the positive lens element 34 is a plastic lens element having an aspherical surface formed on each side thereof. In the fifth numerical embodiment, the positive lens element 34 is a glass-molded lens element having an aspherical surface formed on each side thereof.

In the first through sixth numerical embodiments, the fourth lens group G4 is configured of a positive single lens element 41. The positive single lens element 41 is a plastic lens element having an aspherical surface formed on each side thereof. The positive single lens element 41 is a focusing lens element which is moved along the optical axis direction during focusing.

The zoom lens system of the illustrated embodiments is a four-lens-group zoom lens system configured of a positive lens group, a negative lens group, a positive lens group and a positive lens group, in that order from the object side, and achieves a fast f-number of 3.0 or less at the short focal length extremity (wide-angle extremity) together with a half angle-of-view of 35 degrees or more. Furthermore, in the zoom lens system of the illustrated embodiments, by appropriately determining the refractive power of the positive first lens group G1 and the magnification (lateral magnification) of the positive third lens group G3, miniaturization (slimming) of the first lens group G1 (and in turn the entire zoom lens system) has been successfully achieved, a high zoom ratio of approximately 12:1 has been successfully achieved, and various aberrations such as chromatic aberration and astigmatism has been successfully corrected.

Condition (1) specifies the ratio of the focal length of the first lens group G1 to the focal length of the entire zoom lens system at the long focal length extremity. By determining an optimal refractive power of the first lens group G1 to satisfy condition (1), chromatic aberration especially at the long focal length extremity can be favorably corrected, so that miniaturization (slimming) of the first lens group G1, and in turn the entire zoom lens system, can be successfully achieved.

If the upper limit of condition (1) is exceeded, the refractive power of the first lens group G1 becomes too strong, so that chromatic aberration becomes overcorrected and miniaturization (slimming) of the first lens group G1, and in turn the entire zoom lens system, becomes difficult to achieve.

If the lower limit of condition (1) is exceeded, the refractive power of the first lens group G1 becomes too weak, so that miniaturization (slimming) of the first lens group G1, and in turn the entire zoom lens system, becomes difficult to achieve.

Condition (2) specifies the change in magnification (lateral magnification) of the third lens group G3 that occurs during zooming, i.e., specifies the zooming burden on the third lens group G3. By satisfying condition (2), abaxial aberrations, especially astigmatism, etc., can be favorably corrected and a desired zoom ratio (approximately 12:1) can be achieved.

If the upper limit of condition (2) is exceeded, the refractive power (zooming burden) of the third lens group G3 becomes too large, so that it becomes difficult to correct abaxial aberrations, especially astigmatism, etc.

If the lower limit of condition (2) is exceeded, the refractive power (zooming burden) of the third lens group G3 becomes too small, so that it becomes difficult to achieve a desired zoom ratio (approximately 12:1).

Condition (3) is for suppressing fluctuations in the f-number that occur during zooming while retaining a small f-number of 3.0 or less at the short focal length extremity (wide-angle extremity), and for achieving a desired zoom ratio (approximately 12:1).

If the upper limit of condition (3) is exceeded, the amount of movement along the optical axis of the third lens group G3 during zooming from the short focal length extremity to the long focal length extremity becomes too large, so that fluctuations in the f-number during zooming increase, and the f-number at the long focal length extremity becomes large.

If the lower limit of condition (3) is exceeded, the zoom ratio at the short focal length extremity and at the long focal length extremity becomes too small, so that it becomes difficult to achieve a desired zoom ratio (of approximately 12:1).

As discussed above, in each of the first through sixth numerical embodiments, the third lens group G3 is configured of a positive lens element 31; a cemented lens having a positive lens element 32 and a negative lens element 33; and a positive lens element 34 having at least one aspherical surface formed thereon, in that order from the object side.

Condition (4) specifies the difference in the Abbe numbers, with respect to the d-line, of the positive lens element 32 and of the negative lens element 33 of the cemented lens provided within the third lens group G3. By appropriately selecting a material that is suitable for the cemented lens and satisfies condition (4), chromatic aberration can be favorably corrected while retaining a fast f-number of 3.0 or less at the short focal length extremity (wide-angle extremity).

If the upper limit of condition (4) is exceeded, the chromatic aberration becomes overcorrected.

If the lower limit of condition (4) is exceeded, correction of the chromatic aberration becomes insufficient.

Condition (5) specifies the ratio of the focal length of the second lens group G2 to the focal length of the entire zoom lens system at the long focal length extremity. By determining the optimum refractive power of the second lens group G2 so as to satisfy condition (5), the overall length of the zoom lens system can be suppressed at the long focal length extremity while achieving an angle-of-view of at least 70 degrees at the short focal length extremity, and abaxial aberrations such as astigmatism and lateral chromatic aberration can be favorably corrected.

If the upper limit of condition (5) is exceeded, the refractive power of the second lens group G2 becomes too weak, so that it becomes difficult to reduce the overall length of the zoom lens system at the long focal length extremity and achieve an angle-of-view of at least 70 degrees at the short focal length extremity.

If the lower limit of condition (5) is exceeded, the refractive power of the second lens group G2 becomes too strong, and although advantageous for obtaining a high zoom ratio, correction of abaxial aberrations such as astigmatism and lateral chromatic aberration becomes difficult.

Condition (6) specifies the change in magnification (lateral magnification) of the second lens group G2 that occurs during zooming, i.e., specifies the zooming burden on the second lens group G2. By satisfying condition (6), abaxial aberrations, especially astigmatism and lateral chromatic aberration, etc., can be favorably corrected and a desired zoom ratio (approximately 12:1) can be achieved.

If the upper limit of condition (6) is exceeded, the refractive power (zooming burden) of the second lens group G2 becomes too large, so that although advantageous for achieving a high zoom ratio, it becomes difficult to correct abaxial aberrations, especially astigmatism and lateral chromatic aberration, etc.

If the lower limit of condition (6) is exceeded, the refractive power (zooming burden) of the second lens group G2 becomes too small, so that it becomes difficult to achieve a desired zoom ratio (approximately 12:1).

As discussed above, in each of the first through sixth numerical embodiments, the second lens group G2 is configured of a negative lens element 21, a negative lens element 22 and a positive lens element 23, in that order from the object side.

Condition (7) specifies the refractive index at the d-line of the negative lens element 21 which is provided on the object side within the second lens group G2. By satisfying condition (7), abaxial aberrations, especially astigmatism and lateral chromatic aberration, etc., at the short focal length extremity can be favorably corrected, and the thickness (in the optical axis direction) of the second lens group G2 can be reduced while achieving miniaturization (slimming) of the zoom lens system when at an accommodation position (when the lens barrel of the zoom lens system is at a fully-retracted position thereof).

If the lower limit of condition (7) is exceeded, the radius of curvature of the surface on the image side of the negative lens element 21 becomes small, so that it becomes difficult to correct abaxial aberrations, especially astigmatism and lateral chromatic aberration at the short focal length extremity. Furthermore, the thickness of the second lens group G2 would need to be increased, which is disadvantageous for miniaturization (slimming) of the zoom lens system when at an accommodation position (when the lens barrel of the zoom lens system is at a fully-retracted position thereof).

Condition (8) specifies the difference in the Abbe numbers, with respect to the d-line, of the negative lens element 22 which are provided at the image side and the positive lens element 23 within the second lens group G2. By satisfying condition (8), chromatic aberration can be favorably corrected.

If the upper limit of condition (8) is exceeded, the chromatic aberration becomes overcorrected.

If the lower limit of condition (8) is exceeded, the correction of the chromatic aberration becomes insufficient.

As discussed above, in each of the first through fourth and sixth numerical embodiments, the negative lens element 22 provided at the image side within the second lens group G2 and the positive lens element 34 closest to the image side within the third lens group G3 are plastic lens elements. Accordingly, a reduction in cost can be achieved, and aberration fluctuations that occur during changes in temperature can be suppressed due to a cancelling-out effect of the negative lens element 22 and the positive lens element 34.

As discussed above, in the fifth numerical embodiment, the positive lens element 23 provided within the second lens group G2 and the positive lens element 34 closest to the image side within the third lens group G3 are glass-molded elements. Accordingly, aberration fluctuations that occur during changes in temperature can be suppressed.

Condition (9) is for normalizing the thickness (lens group thickness) of the first lens group G1 with respect to the focal length thereof. By satisfying condition (9), axial chromatic aberration, especially at the long focal length extremity, can be favorably corrected, and the thickness of the first lens group G1 can be reduced, thereby achieving miniaturization (slimming down) of the thickness of the first lens group G1 when at an accommodation position.

If the upper limit of condition (9) is exceeded, the thickness of the first lens group G1 becomes too large, thereby causing difficulty in achieving miniaturization (slimming down) of the thickness of the first lens group G1 when at an accommodation position.

If the lower limit of condition (9) is exceeded, the refractive power of each lens element within the first lens group G1 becomes too small, thereby causing difficulty in correcting axial chromatic aberration, especially at the long focal length extremity.

As discussed above, in each of the first through sixth numerical embodiments, the first lens group G1 is configured of a negative lens element 11 and a positive lens element 12, in that order from the object side.

Condition (10) specifies the difference in the Abbe numbers, with respect to the d-line, of the negative lens element 11 and the positive lens element 12, which are provided within the first lens group G1. By selecting an appropriate material that satisfies condition (10) for the negative lens element 11 and the positive lens element 12, chromatic aberration can be favorably corrected.

If the upper limit of condition (10) is exceeded, chromatic aberration becomes overcorrected.

If the lower limit of condition (10) is exceeded, correction of chromatic aberration becomes insufficient.

As discussed above, the fourth lens group G4 is configured of a positive single lens element 41 and constitutes a focusing lens group which is moved in the optical axis direction during focusing. According to this configuration, a rapid and quiet focusing operation is possible, and also the focusing drive system can be miniaturized, simplified and reduced in cost.

EMBODIMENTS

Specific first through sixth numerical embodiments will be herein discussed. In the aberration diagrams and the tables, the d-line, g-line and C-line show aberrations at their respective wave-lengths; S designates the sagittal image, M designates the meridional image, f designates the focal length of the entire zoom lens system, FNO. designates the f-number, W designates the half angle-of-view (°), Y designates the maximum image height, fB designates the backfocus, L designates the entire length of the zoom lens system, r designates the radius of curvature, d designates the lens thickness or distance between lenses, N(d) designates the refractive index at the d-line, and vd designates the Abbe number with respect to the d-line. The unit used for the various lengths is defined in millimeters (mm). The values for the focal length, the f-number, the half angle-of-view, the maximum image height, the backfocus, the overall length of the lens system, and the distance d between lenses (which changes during zooming) are shown in the following order: short focal length extremity, intermediate focal length, and long focal length extremity.

An aspherical surface which is rotationally symmetrical about the optical axis is defined as:

$$x = cy^2/(1+[1-\{1+K\}c^2y^2]^{1/2}) + A4y^4 + A6y^6 + A8y^8 + A10y^{10} + A12y^{12} \ldots$$

wherein 'c' designates the curvature (1/r) of the aspherical vertex, 'y' designates the distance from the optical axis, 'K' designates the conic coefficient, A4 designates a fourth-order aspherical coefficient, A6 designates a sixth-order aspherical coefficient, A8 designates an eighth-order aspherical coefficient, A10 designates a tenth-order aspherical coefficient, A12 designates a twelfth-order aspherical coefficient, and 'x' designates the amount of sag.

Numerical Embodiment 1

FIGS. 1 through 4D and Tables 1 through 4 show a first numerical embodiment of the zoom lens system according to the present invention. FIG. 1 shows a lens arrangement of the first numerical embodiment of the zoom lens system when focused on an object at infinity, at the short focal length extremity. FIGS. 2A, 2B, 2C and 2D show various aberrations that occurred in the lens arrangement shown in FIG. 1 when the zoom lens system is focused on an object at infinity, at the short focal length extremity. FIGS. 3A, 3B, 3C and 3D show various aberrations that occurred in the lens arrangement shown in FIG. 1 when the zoom lens system is focused on an object at infinity, at an intermediate focal length. FIGS. 4A, 4B, 4C and 4D show various aberrations that occurred in the lens arrangement shown in FIG. 1 when the zoom lens system is focused on an object at infinity, at the long focal length extremity. Table 1 shows the lens surface data, Table 2 shows various data of the zoom lens system, Table 3 shows aspherical surface data, and Table 4 shows lens group data.

The zoom lens system of the first numerical embodiment is configured of a positive first lens group G1, a negative second lens group G2, a positive third lens group G3, and a positive fourth lens group G4, in that order from the object side. A diaphragm S is provided between the second lens group G2 and the third lens group G3 (immediately in front of the third lens group G3), and the diaphragm S moves integrally with the third lens group G3 along the optical axis direction. An optical filter OP is provided between the fourth lens group G4 and the imaging plane I.

The first lens group G1 is configured of a negative meniscus lens element 11 having a convex surface on the object side, and a biconvex positive lens element 12, in that order from the object side.

The second lens group G2 is configured of a biconcave negative lens element 21, a negative meniscus lens element 22 having a convex surface on the object side, and a positive meniscus lens element 23 having a convex surface eon the object side, in that order from the object side. The negative meniscus lens element 22 is a plastic lens element having an aspherical surface formed on each side thereof.

The third lens group G3 is configured of a positive meniscus lens element 31 having a convex surface on the object side, a positive meniscus lens element 32 having a convex surface on the object side, a negative meniscus lens element 33 having a convex surface on the object side, and a positive meniscus lens element 34 having a convex surface on the object side, in that order from the object side. The positive meniscus lens element 32 and the negative meniscus lens element 33 are cemented to each other. The positive meniscus lens element 34 is a plastic lens element having an aspherical surface formed on each side thereof.

The fourth lens group G4 is configured of a biconvex positive single lens element 41. The biconvex positive single lens element 41 is a plastic lens element having an aspherical surface formed on each side thereof. The biconvex positive single lens element 41 also constitutes as a focusing lens group which moves in the optical axis direction during focusing.

TABLE 1

LENS SURFACE DATA

| Surf. No. | r | d | N(d) | ν d |
|---|---|---|---|---|
| 1 | 25.540 | 1.00 | 2.00100 | 29.13 |
| 2 | 18.836 | 0.25 | | |
| 3 | 19.626 | 3.90 | 1.61800 | 63.39 |
| 4 | −199.208 | d4 | | |
| 5 | −51.485 | 0.70 | 1.83481 | 42.72 |
| 6 | 6.892 | 2.42 | | |
| 7* | 10.121 | 0.80 | 1.54358 | 55.71 |
| 8* | 5.958 | 0.27 | | |
| 9 | 13.561 | 1.58 | 1.94594 | 17.98 |
| 10 | 44.529 | d10 | | |
| Diaphragm | ∞ | 0.60 | | |
| 11 | 7.966 | 1.39 | 1.72916 | 54.67 |
| 12 | 17.087 | 0.10 | | |
| 13 | 5.946 | 2.70 | 1.61800 | 63.39 |
| 14 | 11.642 | 0.63 | 2.00100 | 29.13 |
| 15 | 3.909 | 0.19 | | |
| 16* | 4.300 | 1.26 | 1.54358 | 55.71 |
| 17* | 29.697 | d17 | | |
| 18* | 53.076 | 2.12 | 1.54358 | 55.71 |
| 19* | −26.921 | d19 | | |
| 20 | ∞ | 0.80 | 1.51680 | 64.20 |
| 21 | ∞ | — | | |

The asterisk (*) designates an aspherical surface which is rotationally symmetrical with respect to the optical axis.

TABLE 2

LENS-SYSTEM DATA
Zoom Ratio: 11.5

| | Short Focal Length Extremity | Intermediate Focal Length | Long Focal Length Extremity |
|---|---|---|---|
| f | 5.44 | 19.10 | 62.73 |
| FNO. | 2.90 | 4.26 | 6.15 |
| W | 40.54 | 13.61 | 4.17 |
| Y | 3.76 | 4.60 | 4.60 |
| fB | 1.15 | 1.15 | 1.15 |
| L | 53.91 | 60.39 | 84.02 |
| d4 | 1.00 | 12.08 | 24.49 |
| d10 | 21.08 | 6.42 | 1.42 |
| d17 | 5.03 | 8.09 | 24.57 |
| d19 | 4.94 | 11.94 | 11.68 |

TABLE 3

ASPHERICAL SURFACE DATA
(Coefficients not shown are 0.00)

| Surf. No. | K | A4 | A6 | A8 |
|---|---|---|---|---|
| 7 | 0.000 | −3.61448E−03 | 8.47569E−05 | 2.71025E−06 |
| 8 | 0.000 | −4.60675E−03 | 1.26269E−04 | −7.63689E−07 |
| 16 | 0.000 | −4.60928E−05 | −1.92458E−05 | −5.34394E−05 |
| 17 | 0.000 | 9.93073E−04 | −4.00682E−05 | −4.48547E−05 |
| 18 | 0.000 | −4.55437E−05 | −9.46827E−05 | 3.61419E−06 |
| 19 | 0.000 | −1.42966E−07 | −1.00837E−04 | 4.60042E−06 |

| Surf. No. | A10 | A12 |
|---|---|---|
| 7 | −1.46720E−07 | 1.72652E−09 |
| 8 | −4.14066E−08 | |
| 16 | 1.19607E−05 | −9.45659E−07 |
| 17 | 1.15048E−05 | −1.03925E−06 |
| 18 | −1.94645E−08 | −1.20756E−09 |
| 19 | −8.07250E−08 | 1.82643E−10 |

TABLE 4

LENS GROUP DATA

| Lens Group | 1$^{st}$ Surface | Focal Length |
|---|---|---|
| 1 | 1 | 47.66 |
| 2 | 5 | −8.07 |
| 3 | 11 | 12.64 |
| 4 | 18 | 33.17 |

Numerical Embodiment 2

FIGS. 5 through 8D and Tables 5 through 8 show a second numerical embodiment of the zoom lens system according to the present invention. FIG. 5 shows a lens arrangement of the second numerical embodiment of the zoom lens system when focused on an object at infinity, at the short focal length extremity. FIGS. 6A, 6B, 6C and 6D show various aberrations that occurred in the lens arrangement shown in FIG. 5 when the zoom lens system is focused on an object at infinity, at the short focal length extremity. FIGS. 7A, 7B, 7C and 7D show various aberrations that occurred in the lens arrangement shown in FIG. 5 when the zoom lens system is focused on an object at infinity, at an intermediate focal length. FIGS. 8A, 8B, 8C and 8D show various aberrations that occurred in the lens arrangement shown in FIG. 5 when the zoom lens system is focused on an object at infinity, at the long focal length extremity. Table 5 shows the lens surface data, Table 6 shows various data of the zoom lens system, Table 7 shows aspherical surface data, and Table 8 shows lens group data.

The lens arrangement of the second numerical embodiment is the same as that of the first numerical embodiment.

TABLE 5

LENS SURFACE DATA

| Surf. No. | r | d | N(d) | ν d |
|---|---|---|---|---|
| 1 | 22.467 | 1.00 | 2.00100 | 29.13 |
| 2 | 16.918 | 0.25 | | |
| 3 | 17.408 | 4.27 | 1.61800 | 63.39 |
| 4 | −478.121 | d4 | | |
| 5 | −58.014 | 0.70 | 1.83481 | 42.72 |
| 6 | 6.588 | 3.18 | | |
| 7* | 21.664 | 0.80 | 1.54358 | 55.71 |
| 8* | 9.743 | 0.20 | | |
| 9 | 20.911 | 1.58 | 1.94594 | 17.98 |
| 10 | 1430.330 | d10 | | |
| Diaphragm | ∞ | 0.60 | | |
| 11 | 8.390 | 1.39 | 1.72916 | 54.67 |
| 12 | 35.086 | 0.10 | | |
| 13 | 6.986 | 2.70 | 1.61800 | 63.39 |
| 14 | 26.343 | 0.63 | 2.00100 | 29.13 |
| 15 | 4.822 | 0.10 | | |
| 16* | 4.655 | 1.26 | 1.54358 | 55.71 |
| 17* | 10.458 | d17 | | |
| 18* | 14.038 | 2.12 | 1.54358 | 55.71 |
| 19* | −155.263 | d19 | | |
| 20 | ∞ | 0.80 | 1.51680 | 64.20 |
| 21 | ∞ | — | | |

The asterisk (*) designates an aspherical surface which is rotationally symmetrical with respect to the optical axis.

TABLE 6

LENS-SYSTEM DATA
Zoom Ratio: 11.5

| | Short Focal Length Extremity | Intermediate Focal Length | Long Focal Length Extremity |
|---|---|---|---|
| f | 5.50 | 19.10 | 63.47 |
| FNO. | 2.90 | 4.09 | 6.34 |
| W | 40.27 | 13.47 | 4.00 |
| Y | 3.79 | 4.60 | 4.60 |
| fB | 1.15 | 1.15 | 1.15 |
| L | 53.05 | 56.64 | 83.49 |
| d4 | 1.00 | 11.63 | 22.71 |
| d10 | 19.82 | 4.75 | 1.11 |
| d17 | 3.81 | 4.87 | 29.24 |
| d19 | 5.59 | 12.56 | 7.60 |

TABLE 7

ASPHERICAL SURFACE DATA

| Surf. No. | K | A4 | A6 | A8 |
|---|---|---|---|---|
| 7 | 0.000 | −2.08516E−03 | 8.88940E−05 | −1.00114E−06 |
| 8 | 0.000 | −2.52533E−03 | 1.06052E−04 | −3.08752E−06 |
| 16 | 0.000 | 7.71615E−04 | 1.47292E−04 | −5.48293E−05 |
| 17 | 0.000 | 2.46180E−03 | 1.74564E−04 | −4.46356E−05 |
| 18 | 0.000 | 3.76761E−05 | −2.00517E−05 | 9.23770E−07 |
| 19 | 0.000 | 7.02921E−05 | −2.57839E−05 | 1.37360E−06 |

| Surf. No. | A10 | A12 |
|---|---|---|
| 7 | −5.14422E−08 | 1.35625E−09 |
| 8 | 3.18295E−08 | 8.67466E−11 |
| 16 | 1.14044E−05 | −6.86498E−07 |
| 17 | 1.15431E−05 | −6.99914E−07 |

TABLE 7-continued

ASPHERICAL SURFACE DATA

| 18 | −2.69752E−08 | 3.77075E−10 |
| 19 | −4.13046E−08 | 5.54095E−10 |

TABLE 8

LENS GROUP DATA

| Lens Group | 1$^{st}$ Surface | Focal Length |
|---|---|---|
| 1 | 1 | 44.00 |
| 2 | 5 | −8.29 |
| 3 | 11 | 13.50 |
| 4 | 18 | 23.79 |

Numerical Embodiment 3

Figure 9:
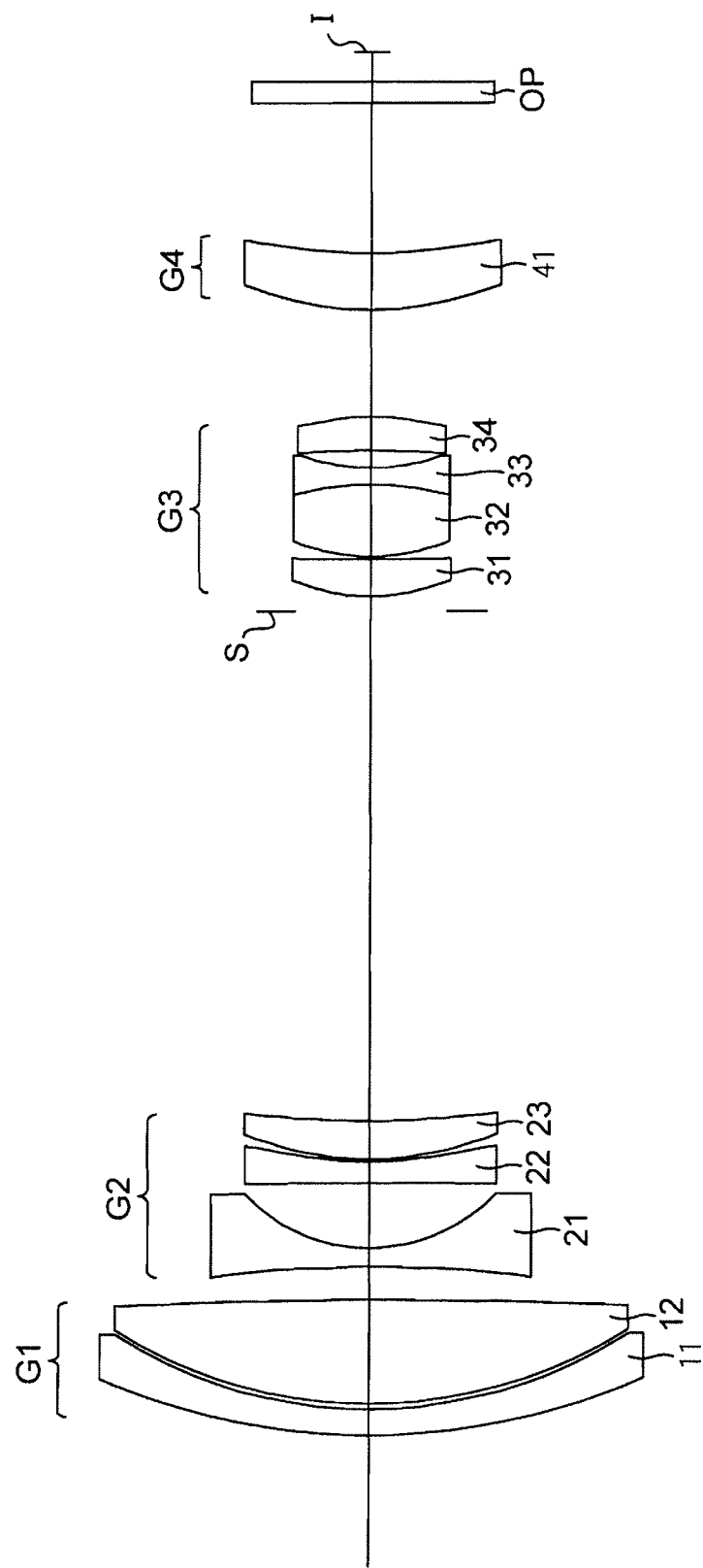
FIG. 9 shows a lens arrangement of a third numerical embodiment of a zoom lens system, when focused on an object at infinity at the short focal length extremity.

FIGS. 9 through 12D and Tables 9 through 12 show a third numerical embodiment of the zoom lens system according to the present invention. FIG. 9 shows a lens arrangement of the third numerical embodiment of the zoom lens system when focused on an object at infinity, at the short focal length extremity. FIGS. 10A, 10B, 10C and 10D show various aberrations that occurred in the lens arrangement shown in FIG. 9 when the zoom lens system is focused on an object at infinity, at the short focal length extremity. FIGS. 11A, 11B, 11C and 11D show various aberrations that occurred in the lens arrangement shown in FIG. 9 when the zoom lens system is focused on an object at infinity, at an intermediate focal length. FIGS. 12A, 12B, 12C and 12D show various aberrations that occurred in the lens arrangement shown in FIG. 9 when the zoom lens system is focused on an object at infinity, at the long focal length extremity. Table 9 shows the lens surface data, Table 10 shows various data of the zoom lens system, Table 11 shows aspherical surface data, and Table 12 shows lens group data.

The lens arrangement of the third numerical embodiment is the same as those of the first and second numerical embodiments, except for the following features:

(1) In the third lens group G3, the positive lens element 32 is a biconvex positive lens element, the negative lens element 33 is a biconcave negative lens element, and the positive lens element 34 is a positive meniscus lens element having a convex surface on the image side.

(2) The positive single lens element 41 of the fourth lens group G4 is a positive meniscus single lens element having a convex surface on the object side.

TABLE 9

LENS SURFACE DATA

| Surf. No. | r | d | N(d) | ν d |
|---|---|---|---|---|
| 1 | 25.249 | 1.00 | 1.95375 | 32.32 |
| 2 | 17.859 | 0.21 | | |
| 3 | 18.153 | 3.96 | 1.59282 | 68.63 |
| 4 | −206.679 | d4 | | |
| 5 | −47.968 | 0.70 | 1.83481 | 42.72 |
| 6 | 6.667 | 2.44 | | |
| 7* | 136.734 | 0.80 | 1.54358 | 55.71 |
| 8* | 13.918 | 0.10 | | |
| 9 | 12.870 | 1.43 | 1.94594 | 17.98 |
| 10 | 40.953 | d10 | | |
| Diaphragm | ∞ | 0.60 | | |
| 11 | 7.989 | 1.39 | 1.61881 | 56.04 |

TABLE 9-continued

LENS SURFACE DATA

| Surf. No. | r | d | N(d) | νd |
|---|---|---|---|---|
| 12 | 231.675 | 0.10 | | |
| 13 | 8.146 | 2.70 | 1.69680 | 55.46 |
| 14 | −11.272 | 0.63 | 1.95375 | 32.32 |
| 15 | 8.223 | 0.65 | | |
| 16* | −33.719 | 1.26 | 1.54358 | 55.71 |
| 17* | −9.813 | d17 | | |
| 18* | 12.481 | 2.12 | 1.54358 | 55.71 |
| 19* | 20.896 | d19 | | |
| 20 | ∞ | 0.80 | 1.51680 | 64.20 |
| 21 | ∞ | — | | |

The asterisk (*) designates an aspherical surface which is rotationally symmetrical with respect to the optical axis.

TABLE 10

LENS-SYSTEM DATA
Zoom Ratio: 11.5

| | Short Focal Length Extremity | Intermediate Focal Length | Long Focal Length Extremity |
|---|---|---|---|
| f | 5.50 | 19.10 | 63.48 |
| FNO. | 2.90 | 4.42 | 6.46 |
| W | 40.27 | 13.47 | 4.04 |
| Y | 3.73 | 4.60 | 4.60 |
| fB | 1.15 | 1.15 | 1.15 |
| L | 52.09 | 58.85 | 80.99 |
| d4 | 1.26 | 12.47 | 25.89 |
| d10 | 19.11 | 5.28 | 0.67 |
| d17 | 4.01 | 7.01 | 26.94 |
| d19 | 5.67 | 12.05 | 5.45 |

TABLE 11

ASPHERICAL SURFACE DATA
(Coefficients not shown are 0.00)

| Surf. No. | K | A4 | A6 | A8 | A10 |
|---|---|---|---|---|---|
| 7 | 0.000 | −7.88890E−04 | 3.66420E−05 | −6.62910E−07 | 4.86870E−09 |
| 8 | 0.000 | −9.47130E−04 | 3.52190E−05 | −7.23300E−07 | 1.85920E−09 |
| 16 | 0.000 | −4.16780E−04 | 4.04720E−05 | 8.73090E−06 | −1.67100E−07 |
| 17 | 0.000 | 3.03250E−04 | 4.94340E−05 | 6.12240E−06 | 4.80210E−08 |
| 18 | 0.000 | −1.47980E−04 | 1.65490E−06 | −4.71440E−08 | |
| 19 | 0.000 | −1.54560E−04 | 2.35280E−06 | −6.89300E−08 | |

TABLE 12

LENS GROUP DATA

| Lens Group | 1$^{st}$ Surface | Focal Length |
|---|---|---|
| 1 | 1 | 49.45 |
| 2 | 5 | −8.17 |
| 3 | 11 | 12.64 |
| 4 | 18 | 52.37 |

Numerical Embodiment 4

Figure 13:
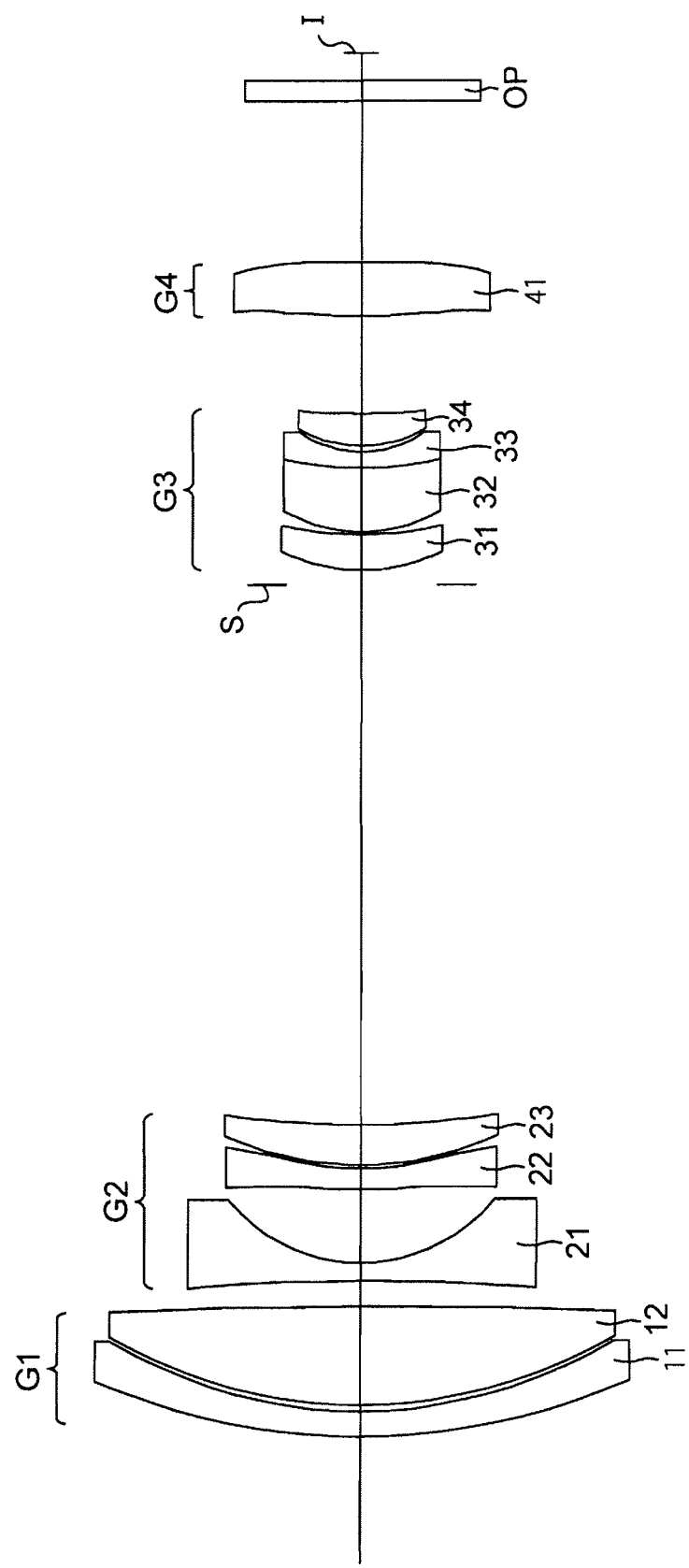
FIG. 13 shows a lens arrangement of a fourth numerical embodiment of a zoom lens system, when focused on an object at infinity at the short focal length extremity.

FIGS. 13 through 16D and Tables 13 through 16 show a fourth numerical embodiment of the zoom lens system according to the present invention. FIG. 13 shows a lens arrangement of the fourth numerical embodiment of the zoom lens system when focused on an object at infinity, at the short focal length extremity. FIGS. 14A, 14B, 14C and 14D show various aberrations that occurred in the lens arrangement shown in FIG. 13 when the zoom lens system is focused on an object at infinity, at the short focal length extremity. FIGS. 15A, 15B, 15C and 15D show various aberrations that occurred in the lens arrangement shown in FIG. 13 when the zoom lens system is focused on an object at infinity, at an intermediate focal length. FIGS. 16A, 16B, 16C and 16D show various aberrations that occurred in the lens arrangement shown in FIG. 13 when the zoom lens system is focused on an object at infinity, at the long focal length extremity. Table 13 shows the lens surface data, Table 14 shows various data of the zoom lens system, Table 15 shows aspherical surface data, and Table 16 shows lens group data.

The lens arrangement of the fourth numerical embodiment is the same as those of the first and second numerical embodiments, except for the following feature:

(1) The positive meniscus lens element 31 of the third lens group G3 is a glass-molded lens element having an aspherical surface formed on the object side thereof.

TABLE 13

LENS SURFACE DATA

| Surf. No. | r | d | N(d) | νd |
|---|---|---|---|---|
| 1 | 26.096 | 1.00 | 2.00100 | 29.13 |
| 2 | 18.939 | 0.25 | | |
| 3 | 19.466 | 3.90 | 1.61800 | 63.39 |
| 4 | −265.620 | d4 | | |
| 5 | −81.287 | 0.70 | 1.83481 | 42.72 |
| 6 | 6.870 | 2.87 | | |
| 7* | 23.110 | 0.80 | 1.54358 | 55.71 |
| 8* | 9.176 | 0.14 | | |
| 9 | 13.228 | 1.58 | 1.94594 | 17.98 |
| 10 | 38.281 | d10 | | |

TABLE 13-continued

LENS SURFACE DATA

| Surf. No. | r | d | N(d) | νd |
|---|---|---|---|---|
| Diaphragm | ∞ | 0.6 | | |
| 11* | 7.476 | 1.39 | 1.72903 | 54.04 |
| 12 | 14.764 | 0.10 | | |
| 13 | 6.288 | 2.50 | 1.61800 | 63.39 |
| 14 | 14.173 | 0.63 | 2.00100 | 29.13 |
| 15 | 4.391 | 0.24 | | |
| 16* | 5.196 | 1.26 | 1.54358 | 55.71 |
| 17* | 74.839 | d17 | | |
| 18* | 29.411 | 2.12 | 1.54358 | 55.71 |
| 19* | −75.512 | d19 | | |
| 20 | ∞ | 0.80 | 1.51680 | 64.2 |
| 21 | ∞ | — | | |

The asterisk (*) designates an aspherical surface which is rotationally symmetrical with respect to the optical axis.

TABLE 14

LENS-SYSTEM DATA
Zoom Ratio: 11.5

|  | Short Focal Length Extremity | Intermediate Focal Length | Long Focal Length Extremity |
|---|---|---|---|
| f | 5.50 | 19.10 | 63.51 |
| FNO. | 2.90 | 4.27 | 6.28 |
| W | 40.27 | 13.45 | 4.07 |
| Y | 3.79 | 4.60 | 4.60 |
| fB | 1.15 | 1.15 | 1.15 |
| L | 54.11 | 60.15 | 83.46 |
| d4 | 1.00 | 12.52 | 26.02 |
| d10 | 21.04 | 6.15 | 1.47 |
| d17 | 3.81 | 6.53 | 25.69 |
| d19 | 6.23 | 12.92 | 8.25 |

TABLE 15

ASPHERICAL SURFACE DATA
(Coefficients not shown are 0.00)

| Surf. No. | K | A4 | A6 | A8 |
|---|---|---|---|---|
| 7 | −74.830 | −1.02629E−03 | 4.31567E−05 | −1.03022E−06 |
| 8 | −11.327 | −3.53275E−04 | 1.69980E−05 | −4.76578E−07 |
| 11 | 0.000 | −9.71418E−05 | 4.48961E−06 | −1.62740E−07 |
| 16 | 0.000 | 8.84656E−04 | −2.03213E−04 | 6.35024E−05 |
| 17 | 0.000 | 1.59633E−03 | −2.15862E−04 | 7.52643E−05 |
| 18 | 0.000 | −1.25874E−04 | −4.16451E−05 | 3.37612E−06 |
| 19 | 0.000 | −1.51957E−04 | −3.95775E−05 | 3.08306E−06 |

| Surf. No. | A10 | A12 |
|---|---|---|
| 7 | 1.03871E−08 | |
| 8 | 3.44798E−09 | |
| 11 | | |
| 16 | −8.83263E−06 | 5.03966E−07 |
| 17 | −1.05723E−05 | 6.09112E−07 |
| 18 | −1.17811E−07 | 1.23225E−09 |
| 19 | −1.04349E−07 | 1.10718E−09 |

TABLE 16

LENS GROUP DATA

| Lens Group | 1st Surface | Focal Length |
|---|---|---|
| 1 | 1 | 50.12 |
| 2 | 5 | −8.48 |
| 3 | 11 | 13.04 |
| 4 | 18 | 39.22 |

Numerical Embodiment 5

Figure 17:
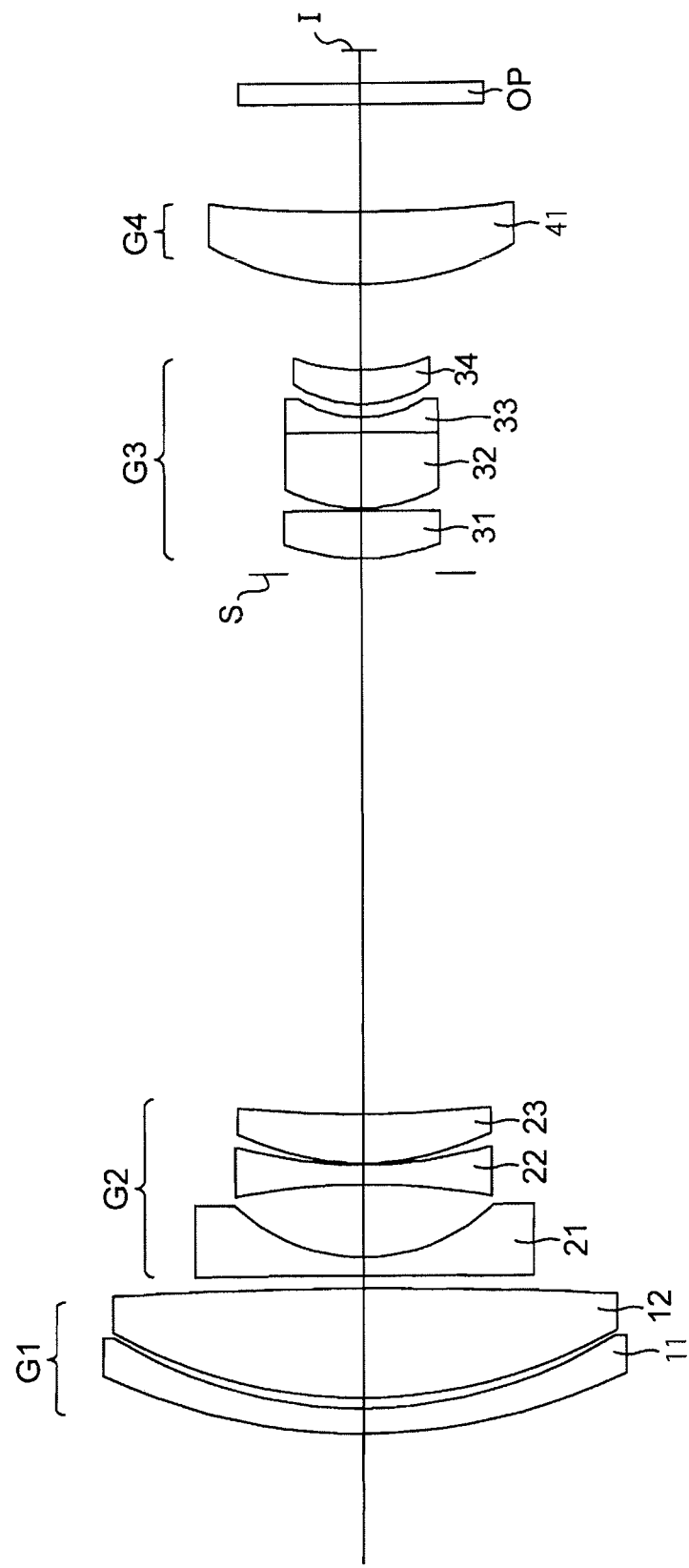
FIG. 17 shows a lens arrangement of a fifth numerical embodiment of a zoom lens system, when focused on an object at infinity at the short focal length extremity.
Figure 20A:
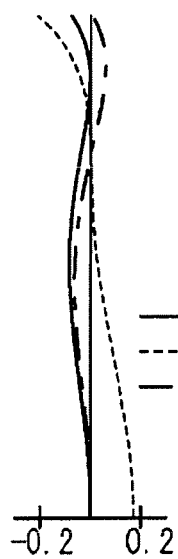
FIGS. 20A, 20B, 20C and 20D show various aberrations that occurred in the zoom lens system having the lens arrangement of FIG. 17, when focused on an object at infinity at the long focal length extremity.
Figure 20B:
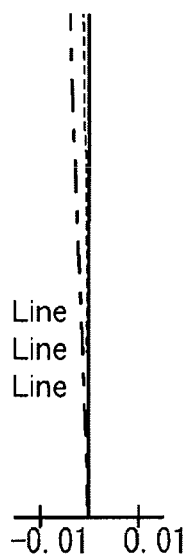
Figure 20C:
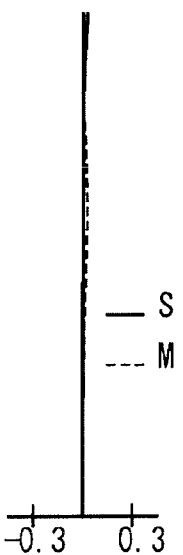
Figure 20D:
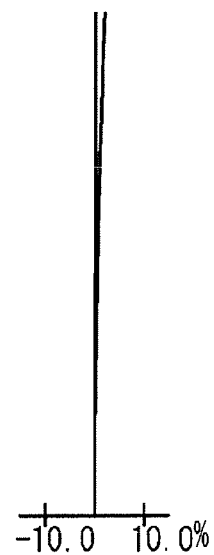

FIGS. 17 through 20D and Tables 17 through 20 show a fifth numerical embodiment of the zoom lens system according to the present invention. FIG. 17 shows a lens arrangement of the fifth numerical embodiment of the zoom lens system when focused on an object at infinity, at the short focal length extremity. FIGS. 18A, 18B, 18C and 18D show various aberrations that occurred in the lens arrangement shown in FIG. 17 when the zoom lens system is focused on an object at infinity, at the short focal length extremity. FIGS. 19A, 19B, 19C and 19D show various aberrations that occurred in the lens arrangement shown in FIG. 17 when the zoom lens system is focused on an object at infinity, at an intermediate focal length. FIGS. 20A, 20B, 20C and 20D show various aberrations that occurred in the lens arrangement shown in FIG. 17 when the zoom lens system is focused on an object at infinity, at the long focal length extremity. Table 17 shows the lens surface data, Table 18 shows various data of the zoom lens system, Table 19 shows aspherical surface data, and Table 20 shows lens group data.

The lens arrangement of the fifth numerical embodiment is the same as those of the first and second numerical embodiments, except for the following features:

(1) The negative lens element 22 of the second lens group G2 is a biconcave negative lens element. The biconcave negative lens element 22 is a glass lens element and has a spherical surface formed on each side thereof.

(2) The positive meniscus lens element 23 of the second lens group G2 is a glass-molded lens element having an aspherical surface formed on each side thereof.

(3) In the third lens group G3, the positive lens element 31 is a biconvex positive lens element, and the positive lens element 32 is a biconvex positive lens element, and the negative lens element 33 is a biconcave negative lens element.

(4) The positive meniscus lens element 34 of the third lens group G3 is a glass-molded lens element having an aspherical surface formed on each side thereof.

TABLE 17

LENS SURFACE DATA

| Surf. No. | r | d | N(d) | ν d |
|---|---|---|---|---|
| 1 | 23.025 | 1.00 | 2.00690 | 25.46 |
| 2 | 18.277 | 0.42 | | |
| 3 | 19.700 | 4.23 | 1.59349 | 67.00 |
| 4 | −190.620 | d4 | | |
| 5 | −561.500 | 0.70 | 1.83481 | 42.72 |
| 6 | 7.422 | 2.79 | | |
| 7 | −26.478 | 0.75 | 1.80420 | 46.50 |
| 8 | 18.678 | 0.05 | | |
| 9* | 10.291 | 1.90 | 1.92286 | 20.88 |
| 10* | 44.179 | d10 | | |
| Diaphragm | ∞ | 0.60 | | |
| 11 | 9.224 | 1.80 | 1.69680 | 55.46 |
| 12 | −414.800 | 0.10 | | |
| 13 | 6.534 | 2.92 | 1.61800 | 63.39 |
| 14 | −86.282 | 0.56 | 1.95375 | 32.32 |
| 15 | 4.819 | 0.49 | | |
| 16* | 5.200 | 1.32 | 1.55332 | 71.68 |
| 17* | 9.763 | d17 | | |
| 18* | 12.960 | 2.80 | 1.54358 | 55.71 |
| 19* | 83.806 | d19 | | |
| 20 | ∞ | 0.80 | 1.51680 | 64.20 |
| 21 | ∞ | — | | |

The asterisk (*) designates an aspherical surface which is rotationally symmetrical with respect to the optical axis.

TABLE 18

LENS-SYSTEM DATA
Zoom Ratio : 13.3

|  | Short Focal Length Extremity | Intermediate Focal Length | Long Focal Length Extremity |
|---|---|---|---|
| f | 5.49 | 19.03 | 72.77 |
| FNO. | 2.86 | 4.54 | 6.90 |
| W | 40.29 | 13.64 | 3.58 |
| Y | 3.75 | 4.63 | 4.63 |
| fB | 1.15 | 1.15 | 1.15 |
| L | 52.92 | 53.94 | 84.75 |
| d4 | 0.50 | 7.96 | 22.50 |
| d10 | 20.69 | 5.13 | 0.40 |
| d17 | 3.26 | 3.58 | 27.91 |
| d19 | 4.09 | 12.89 | 9.56 |

TABLE 19

ASPHERICAL SURFACE DATA
(Coefficients not shown are 0.00)

| Surf. No. | K | A4 | A6 | A8 | A10 |
|---|---|---|---|---|---|
| 9 | 0.000 | −2.27371E−04 | 5.33253E−06 | −1.99722E−07 | −1.63190E−09 |
| 10 | 0.000 | −8.87226E−05 | 8.03599E−06 | −3.26307E−07 | 9.55561E−10 |
| 16 | 0.000 | 5.81772E−04 | −4.43197E−05 | 5.59339E−06 | |
| 17 | 0.000 | 1.87754E−03 | −2.79531E−05 | 8.41844E−06 | |
| 18 | 0.000 | −1.33208E−05 | −3.09400E−07 | 5.78411E−08 | |
| 19 | 0.000 | 2.77069E−05 | −3.98775E−07 | 7.72952E−08 | |

TABLE 20

LENS GROUP DATA

| Lens Group | 1st Surface | Focal Length |
|---|---|---|
| 1 | 1 | 44.65 |
| 2 | 5 | −8.36 |
| 3 | 11 | 12.46 |
| 4 | 18 | 27.82 |

Numerical Embodiment 6

Figure 21:
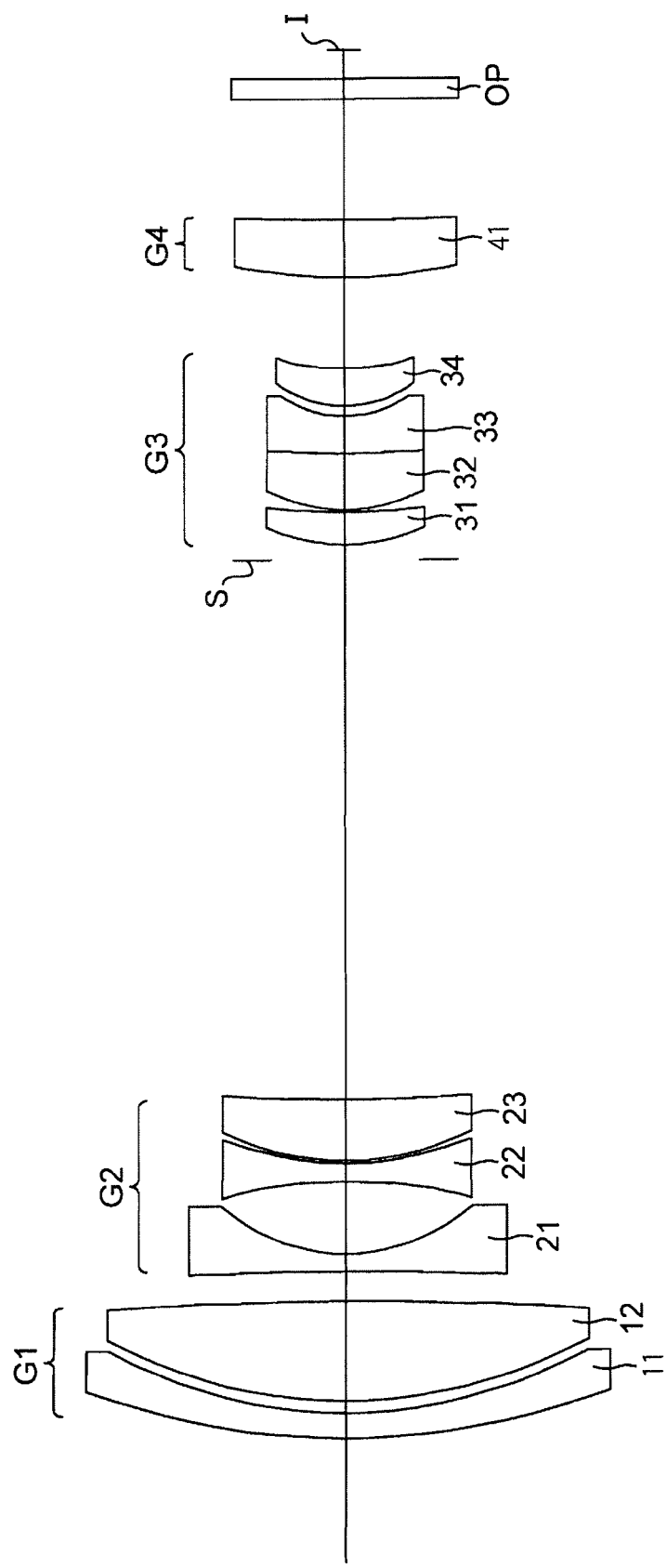
FIG. 21 shows a lens arrangement of a sixth numerical embodiment of a zoom lens system, when focused on an object at infinity at the short focal length extremity.
Figure 24A:
FIGS. 24A, 24B, 24C and 24D show various aberrations that occurred in the zoom lens system having the lens arrangement of FIG. 21, when focused on an object at infinity at the long focal length extremity.
Figure 24B:
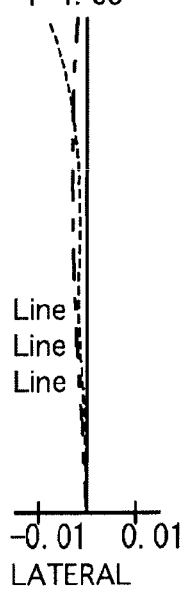
Figure 24C:
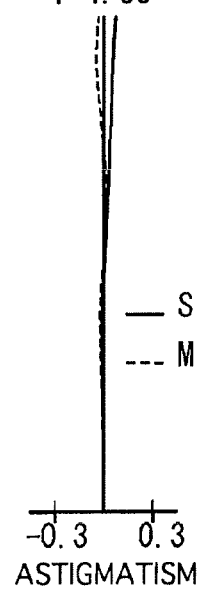
Figure 24D:
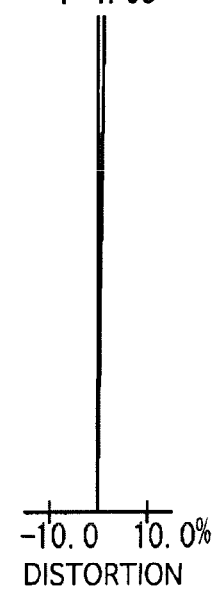
Figure 25:
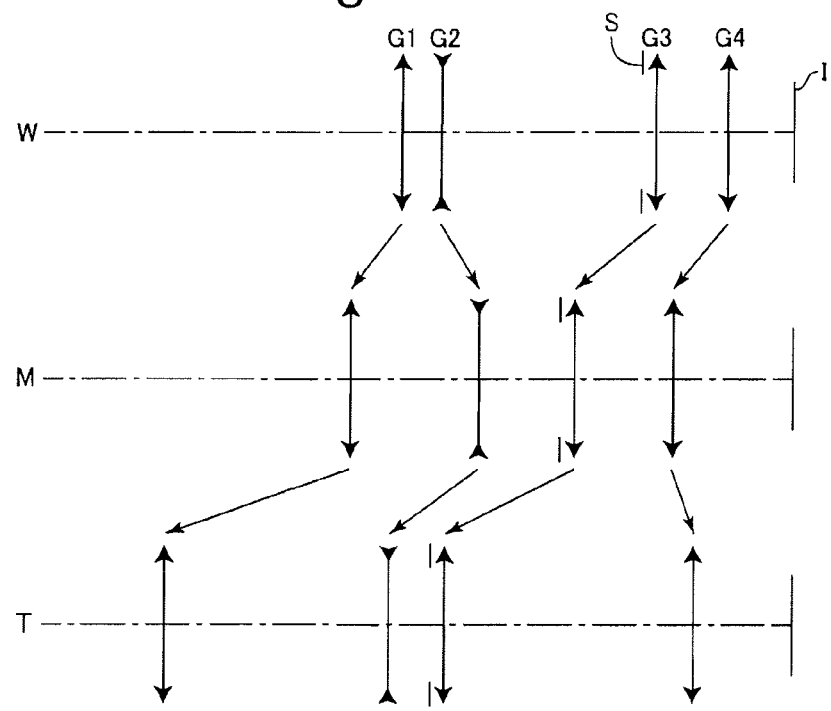
FIG. 25 shows a first zoom path (first numerical embodiment) of the zoom lens system according to the present invention.
Figure 26:
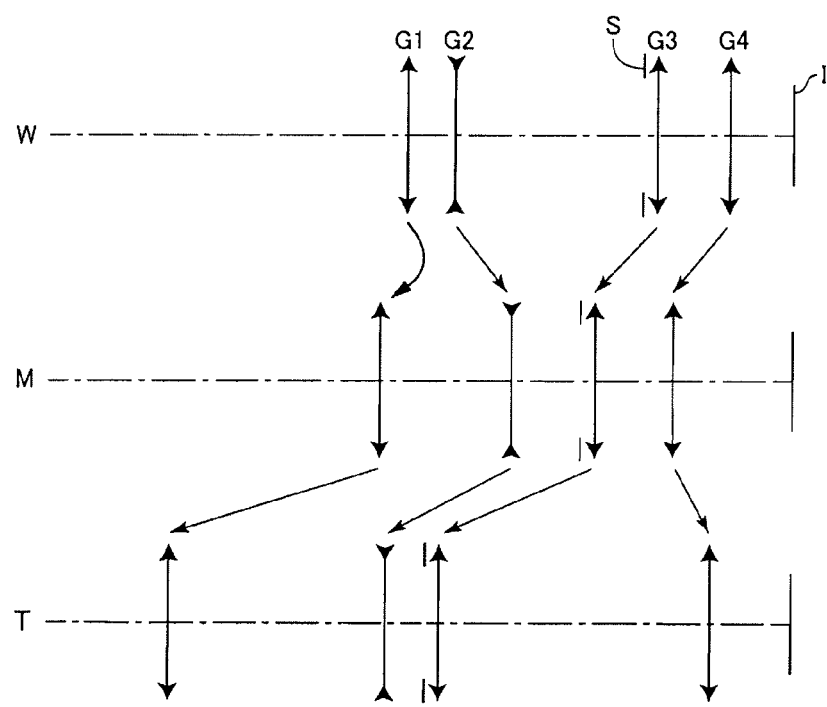
FIG. 26 shows a second zoom path (second numerical embodiment) of the zoom lens system according to the present invention.
Figure 27:
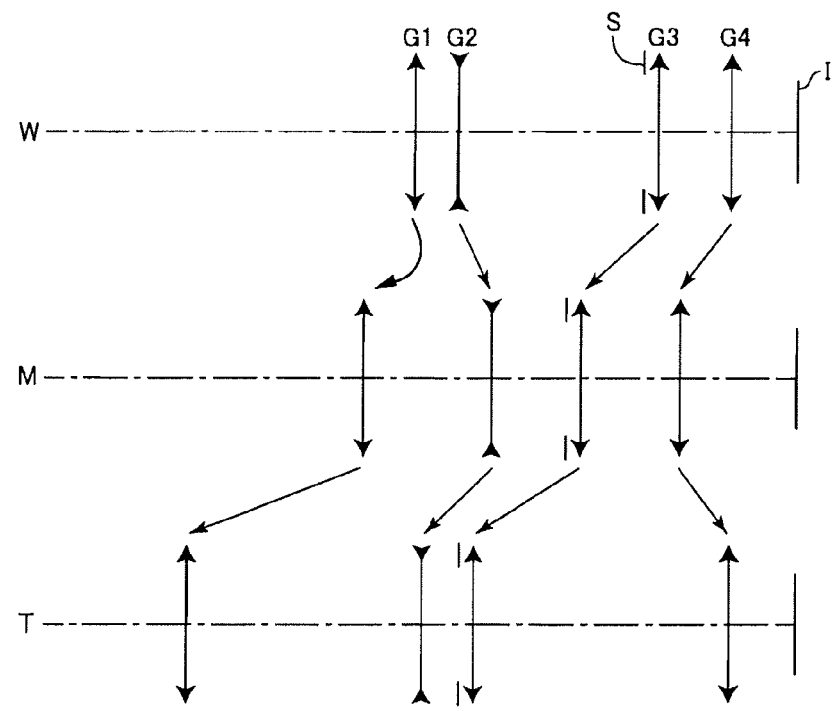
FIG. 27 shows a third zoom path (third numerical embodiment) of the zoom lens system according to the present invention.
Figure 28:
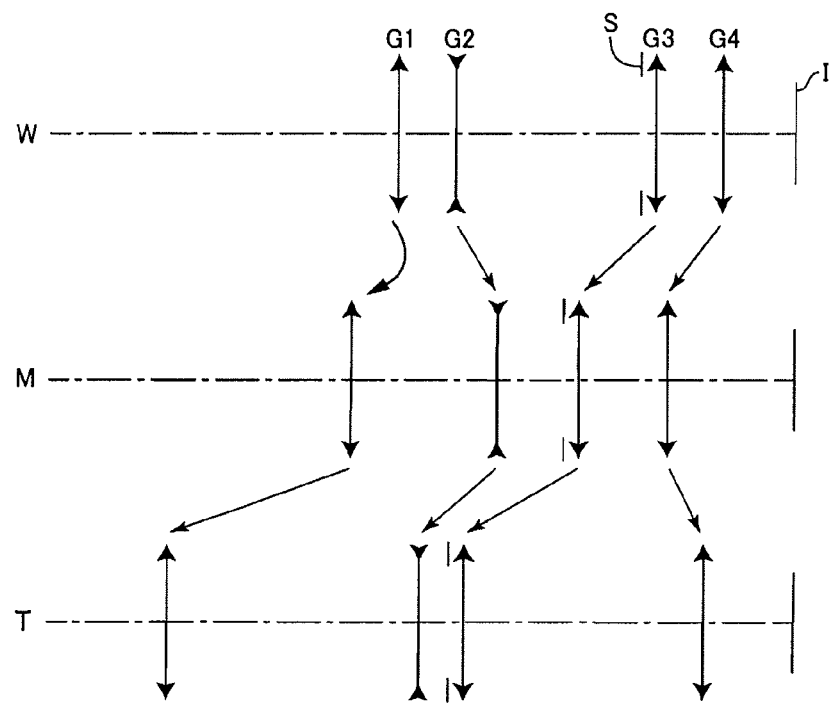
FIG. 28 shows a fourth zoom path (fourth numerical embodiment) of the zoom lens system according to the present invention.
Figure 29:
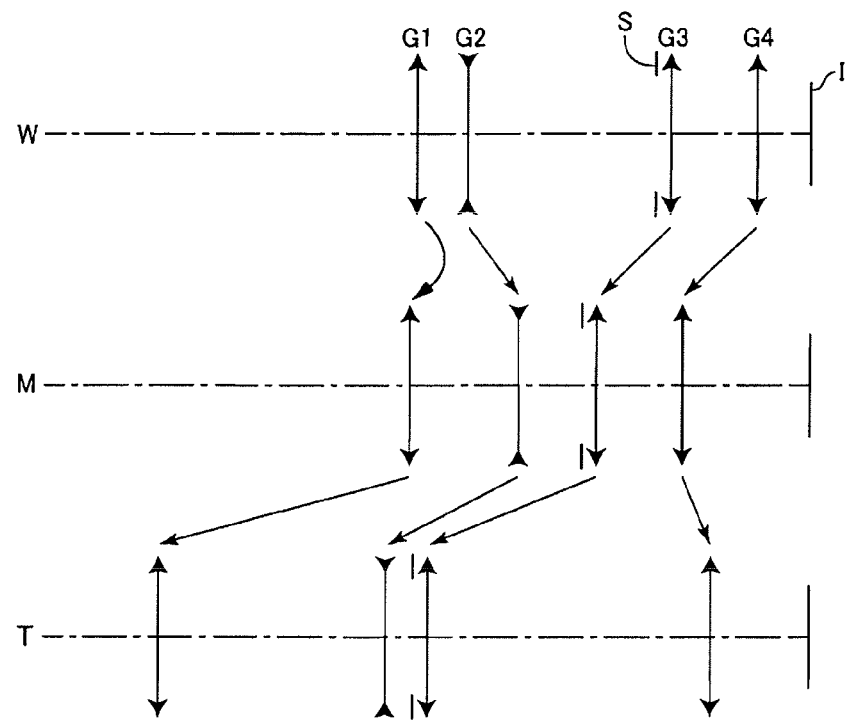
FIG. 29 shows a fifth zoom path (fifth numerical embodiment) of the zoom lens system according to the present invention.
Figure 30:
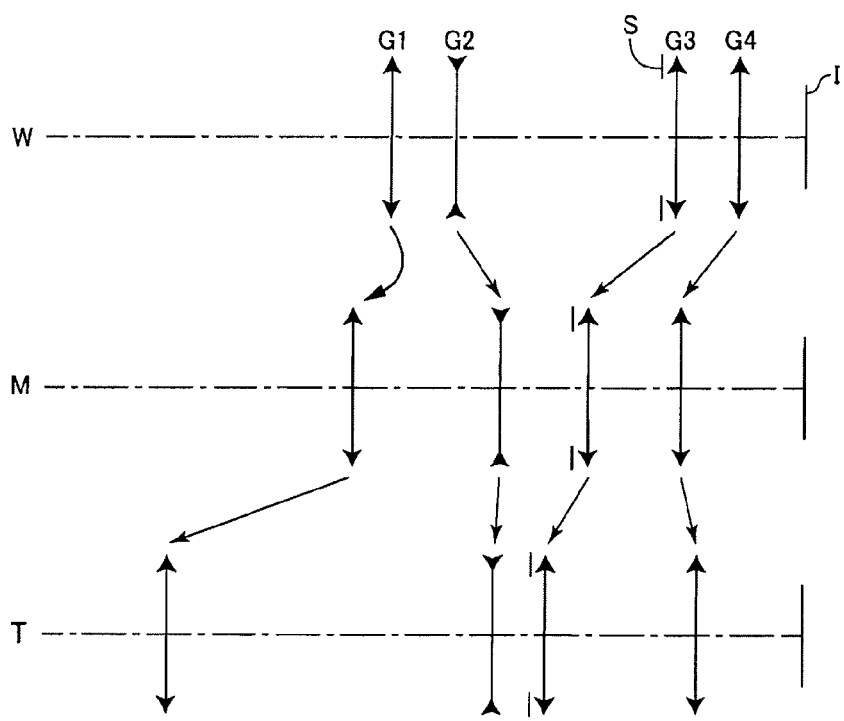
FIG. 30 shows a sixth zoom path (sixth numerical embodiment) of the zoom lens system according to the present invention.

FIGS. 21 through 24D and Tables 21 through 24 show a sixth numerical embodiment of the zoom lens system according to the present invention. FIG. 21 shows a lens arrangement of the sixth numerical embodiment of the zoom lens system when focused on an object at infinity, at the short focal length extremity. FIGS. 22A, 22B, 22C and 22D show various aberrations that occurred in the lens arrangement shown in FIG. 21 when the zoom lens system is focused on an object at infinity, at the short focal length extremity. FIGS. 23A, 23B, 23C and 23D show various aberrations that occurred in the lens arrangement shown in FIG. 21 when the zoom lens system is focused on an object at infinity, at an intermediate focal length. FIGS. 24A, 24B, 24C and 24D show various aberrations that occurred in the lens arrangement shown in FIG. 21 when the zoom lens system is focused on an object at infinity, at the long focal length extremity. Table 21 shows the lens surface data, Table 22 shows various data of the zoom lens system, Table 23 shows aspherical surface data, and Table 24 shows lens group data.

The lens arrangement of the sixth numerical embodiment is the same as those of the first and second numerical embodiments, except for the following features:

(1) The negative lens element 22 of the second lens group G2 is a biconcave negative lens element.

(2) The positive single lens element 41 of the fourth lens group G4 is a positive meniscus single lens element having a convex surface on the object side.

TABLE 21

LENS SURFACE DATA

| Surf. No. | r | d | N(d) | ν d |
|---|---|---|---|---|
| 1 | 29.688 | 1.00 | 1.95375 | 32.32 |
| 2 | 19.390 | 0.47 | | |
| 3 | 19.724 | 4.03 | 1.58913 | 61.25 |
| 4 | −148.353 | d4 | | |
| 5 | −149.119 | 0.70 | 1.83481 | 42.72 |
| 6 | 7.632 | 2.84 | | |
| 7* | −27.930 | 0.75 | 1.54358 | 55.71 |
| 8* | 12.190 | 0.10 | | |
| 9 | 11.572 | 2.44 | 1.92119 | 23.96 |
| 10 | 75.516 | d10 | | |
| Diaphragm | ∞ | 0.60 | | |
| 11 | 7.804 | 1.27 | 1.69680 | 55.46 |
| 12 | 24.960 | 0.10 | | |
| 13 | 6.724 | 2.24 | 1.59349 | 67.00 |
| 14 | 42.148 | 1.48 | 1.90366 | 31.32 |
| 15 | 4.596 | 0.40 | | |
| 16* | 4.848 | 1.51 | 1.54358 | 55.71 |
| 17* | 15.247 | d17 | | |
| 18* | 19.176 | 2.30 | 1.54358 | 55.71 |
| 19* | 76.335 | d19 | | |
| 20 | ∞ | 0.80 | 1.51680 | 64.20 |
| 21 | ∞ | — | | |

The asterisk (*) designates an aspherical surface which is rotationally symmetrical with respect to the optical axis.

TABLE 22

LENS-SYSTEM DATA
Zoom Ratio: 11.5

| | Short Focal Length Extremity | Intermediate Focal Length | Long Focal Length Extremity |
|---|---|---|---|
| f | 5.50 | 19.10 | 63.26 |
| FNO. | 2.89 | 4.60 | 5.35 |
| W | 40.35 | 13.60 | 4.14 |
| Y | 3.79 | 4.63 | 4.63 |
| fB | 1.15 | 1.15 | 1.15 |
| L | 55.06 | 59.76 | 82.60 |
| d4 | 1.17 | 11.19 | 33.60 |
| d10 | 21.36 | 5.46 | 0.55 |
| d17 | 3.60 | 6.98 | 14.37 |
| d19 | 4.75 | 11.95 | 9.84 |

TABLE 23

ASPHERICAL SURFACE DATA
(Coefficients not shown are 0.00)

| Surf. No. | K | A4 | A6 | A8 |
|---|---|---|---|---|
| 7 | 0.000 | −2.81871E−04 | −5.11247E−06 | 1.83318E−07 |
| 8 | 0.000 | −2.96462E−04 | 1.19054E−06 | 1.27619E−07 |
| 16 | 0.000 | 2.88811E−04 | −2.01055E−06 | 4.61166E−06 |
| 17 | 0.000 | 1.95044E−03 | 1.39324E−05 | 9.32210E−06 |
| 18 | 0.000 | −1.08790E−04 | −1.71692E−06 | |
| 19 | 0.000 | −1.40369E−04 | −3.21016E−06 | 1.01744E−08 |

TABLE 24

LENS GROUP DATA

| Lens Group | 1st Surface | Focal Length |
|---|---|---|
| 1 | 1 | 58.30 |
| 2 | 5 | -9.16 |
| 3 | 11 | 12.50 |
| 4 | 18 | 46.45 |

The numerical values of each condition for each of the first through sixth numerical embodiments are shown in Table 25.

TABLE 25

|  | Embod. 1 | Embod. 2 | Embod. 3 |
|---|---|---|---|
| Cond. (1) | 1.316 | 1.443 | 1.284 |
| Cond. (2) | 5.25 | 4.11 | 3.84 |
| Cond. (3) | 0.495 | 0.517 | 0.428 |
| Cond. (4) | 34.3 | 34.3 | 23.1 |
| Cond. (5) | -7.77 | -7.66 | -7.77 |
| Cond. (6) | 2.96 | 3.23 | 2.99 |
| Cond. (7) | 1.83 | 1.83 | 1.83 |
| Cond. (8) | 37.7 | 37.7 | 37.7 |
| Cond. (9) | 0.108 | 0.125 | 0.105 |
| Cond. (10) | 34.3 | 34.3 | 36.3 |

|  | Embod. 4 | Embod. 5 | Embod. 6 |
|---|---|---|---|
| Cond. (1) | 1.267 | 1.630 | 1.085 |
| Cond. (2) | 4.11 | 5.77 | 3.75 |
| Cond. (3) | 0.450 | 0.491 | 0.298 |
| Cond. (4) | 34.3 | 31.1 | 35.7 |
| Cond. (5) | -7.49 | -8.70 | -6.91 |
| Cond. (6) | 3.01 | 3.16 | 3.55 |
| Cond. (7) | 1.83 | 1.83 | 1.83 |
| Cond. (8) | 37.7 | 25.6 | 31.8 |
| Cond. (9) | 0.103 | 0.127 | 0.094 |
| Cond. (10) | 34.3 | 41.5 | 28.9 |

As can be understood from Table 25, the first through sixth numerical embodiments satisfy conditions (1) through (10). Furthermore, as can be understood from the aberration diagrams, the various aberrations are suitably corrected.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A zoom lens system comprising a positive first lens group, a negative second lens group, a positive third lens group and a positive fourth lens group, in that order from the object side,
wherein upon zooming from the short focal length extremity to the long focal length extremity, each of said first through fourth lens groups move along the optical axis thereof, and
wherein the following conditions (1) and (2) are satisfied:

$$1.05 < ft/f1 < 1.75 \quad (1), \text{and}$$

$$3.7 < M3t/M3w < 6.3 \quad (2), \text{wherein}$$

f1 designates the focal length of said first lens group,
ft designates the focal length of the entire zoom lens system at the long focal length extremity,
M3t designates the lateral magnification of said third lens group when focusing on an object at infinity at the long focal length extremity, and
M3w designates the lateral magnification of said third lens group when focusing on an object at infinity at the short focal length extremity.

2. The zoom lens system according to claim 1, wherein the following condition (3) is satisfied:

$$0.27 < \Delta 3Gx/(y\max*(ft/fw)) < 0.60 \quad (3),$$

wherein
Δ3Gx designates the movement amount of said third lens group along the optical axis upon zooming from the short focal length extremity to the long focal length extremity,
ymax designates the maximum image height,
ft designates the focal length of the entire zoom lens system at the long focal length extremity, and
fw designates the focal length of the entire zoom lens system at the short focal length extremity.

3. The zoom lens system according to claim 1, wherein said third lens group comprises a positive lens element; a cemented lens having a positive lens element and a negative lens element; and a positive lens element having at least one aspherical surface formed thereon, in that order from the object side, and wherein the following condition (4) is satisfied:

$$20 < v32 - v33 < 45 \quad (4), \text{wherein}$$

v32 designates the Abbe number, with respect to the d-line, of the positive lens element of the cemented lens provided within said third lens group, and
v33 designates the Abbe number, with respect to the d-line, of the negative lens element of the cemented lens provided within said third lens group.

4. The zoom lens system according to claim 1, wherein the following condition (5) is satisfied:

$$-8.8 < ft/f2 < -5.8 \quad (5), \text{wherein}$$

f2 designates the focal length of said second lens group, and
ft designates the focal length of the entire zoom lens system at the long focal length extremity.

5. The zoom lens system according to claim 1, wherein the following condition (6) is satisfied:

$$2.6 < M2t/M2w < 4.2 \quad (6), \text{wherein}$$

M2t designates the lateral magnification of said second lens group when focusing on an object at infinity at the long focal length extremity, and
M2w designates the lateral magnification of said second lens group when focusing on an object at infinity at the short focal length extremity.

6. The zoom lens system according to claim 1, wherein said second lens group comprises a negative lens element, a negative lens element, and a positive lens element, in that order from the object side, wherein the following conditions (7) and (8) are satisfied:

$$n21 > 1.8 \quad (7), \text{and}$$

$$20 < v22 - v23 < 45 \quad (8), \text{wherein}$$

n21 designates the refractive index, at the d-line, of the negative lens element on the object side provided within said second lens group,
v22 designates the Abbe number, with respect to the d-line, of the negative lens element on the image side provided within said second lens group, and
v23 designates the Abbe number, with respect to the d-line, of the positive lens element provided within said second lens group.

7. The zoom lens system according to claim 6, wherein said third lens group comprises a positive lens element closest to the image side, and
wherein each of the negative lens element provided on the image side within said second lens group and the positive lens element provided closest to the image side within said third lens group is a plastic lens element.

8. The zoom lens system according to claim 6, wherein said third lens group comprises a positive lens element closest to the image side, and
wherein each of the positive lens element provided within said second lens group and the positive lens element provided closest to the image side within said third lens group is a glass-molded lens element.

9. The zoom lens system according to claim 1, wherein the following condition (9) is satisfied:

$$0.06 < D1/f1 < 0.13 \qquad (9), \text{wherein}$$

D1 designates the thickness of said first lens group, and
f1 designates the focal length of said first lens group.

10. The zoom lens system according to claim 1, wherein said first lens group comprises a negative lens element and a positive lens element, in that order from the object side, wherein the following condition (10) is satisfied:

$$25 < v12 - v11 < 45 \qquad (10), \text{wherein}$$

v11 designates the Abbe number, with respect to the d-line, of the negative lens element provided within said first lens group, and
v12 designates the Abbe number, with respect to the d-line, of the positive lens element provided within said first lens group.

11. The zoom lens system according to claim 1, wherein said fourth lens group comprises a positive single lens element, and wherein said positive single lens element constitutes a focusing lens group which moves in the optical axis direction during focusing.

* * * * *